United States Patent
Liu et al.

(10) Patent No.: US 12,382,286 B2
(45) Date of Patent: Aug. 5, 2025

(54) SECURITY AUTHENTICATION METHOD AND APPARATUS APPLIED TO Wi-Fi

(71) Applicant: HUAWEI TECHNOLOGIES CO., LTD., Guangdong (CN)

(72) Inventors: Kai Liu, Shanghai (CN); Yanjie Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 18/322,728

(22) Filed: May 24, 2023

(65) Prior Publication Data
US 2023/0300615 A1    Sep. 21, 2023

Related U.S. Application Data

(63) Continuation of application No. PCT/CN2020/131855, filed on Nov. 26, 2020.

(51) Int. Cl.
*H04W 12/06* (2021.01)
*H04W 12/0433* (2021.01)
*H04W 84/12* (2009.01)

(52) U.S. Cl.
CPC ....... *H04W 12/06* (2013.01); *H04W 12/0433* (2021.01); *H04W 84/12* (2013.01)

(58) Field of Classification Search
CPC ............. H04W 12/0433; H04W 12/06; H04W 12/082; H04L 63/061; H04L 63/083; H04L 63/0838
See application file for complete search history.

(56) References Cited

U.S. PATENT DOCUMENTS 8,588,413 B1    11/2013    Kalbag et al.
2012/0239923 A1*  9/2012    Karl ................... H04L 41/0806
                                              713/153

(Continued)

FOREIGN PATENT DOCUMENTS

CN    106664556 A    5/2017
EP    1379053 A1    1/2004

OTHER PUBLICATIONS

IEEE Std 802.11™-2016 (Revision of IEEE Std 802.11-2012), "Part 11: Wireless LAN Medium Access Control (MAC) and Physical Layer (PHY) Specifications," IEEE Computer Society, Sponsored by the LAN/MAN Standards Committee, Dec. 7, 2016; 3534 total pages.

*Primary Examiner* — Eric W Shepperd
(74) *Attorney, Agent, or Firm* — Rimon PC

(57) ABSTRACT

This application provides a security authentication method and apparatus applied to Wi-Fi, to help prevent a password from being shared among a plurality of devices, and implement management of a second device by a first device. In the method, an access point AP receives a first password input by the first device, where the first password is a password preset before delivery; and when checking the first password by the AP succeeds, the AP obtains a second password shared between the AP and the first device, and performs a 4-way handshake with the first device based on the second password. The second password is a shared key between the first device and the AP. Then, the AP can receive a first request from the first device, and send a third password to the first device in response to the first request.

20 Claims, 9 Drawing Sheets

(56) References Cited

U.S. PATENT DOCUMENTS

| | | | | |
|---|---|---|---|---|
| 2015/0113277 A1* | 4/2015 | Harkins | ................ | H04W 12/50 |
| | | | | 713/171 |
| 2015/0223068 A1* | 8/2015 | Thelen | ................ | H04W 12/069 |
| | | | | 726/7 |
| 2015/0229475 A1* | 8/2015 | Benoit | ................ | H04W 12/069 |
| | | | | 713/168 |
| 2016/0087967 A1* | 3/2016 | Pang | ..................... | H04W 76/11 |
| | | | | 726/6 |
| 2018/0109381 A1* | 4/2018 | Cammarota | ........ | H04W 12/041 |
| 2018/0131519 A1* | 5/2018 | Le Scouarnec | ....... | H04L 9/3226 |
| 2019/0261168 A1* | 8/2019 | Shi | ........................ | H04W 12/35 |
| 2019/0297656 A1* | 9/2019 | Yuan | ..................... | H04W 12/50 |
| 2020/0068483 A1* | 2/2020 | Likar | .................. | H04W 76/11 |
| 2022/0043904 A1* | 2/2022 | Peng | ..................... | G06F 21/46 |
| 2023/0284024 A1* | 9/2023 | Hotchkiss | ............. | H04W 12/06 |
| | | | | 726/4 |

\* cited by examiner

A    B

Cyclic group G whose order is a prime number $p$, $U, V \xleftarrow{R} G$, and $H: \{0,1\}^* \xrightarrow{R} \{0,1\}^l$ $g \leftarrow U \cdot V^{pw}, x \xleftarrow{R} Z_p^*, X \leftarrow g^x$ $\xrightarrow{A \| X}$ $\xleftarrow{Y}$ $g \leftarrow U \cdot V^{pw}, y \xleftarrow{R} Z_p^*, Y \leftarrow g^y$ $Z \leftarrow Y^x$ $\hspace{4cm} Z \leftarrow X^y$ $sk \leftarrow H(A\|B\|g\|X\|Y\|Z)$

FIG. 5

SECURITY AUTHENTICATION METHOD AND APPARATUS APPLIED TO Wi-Fi

CROSS-REFERENCE TO RELATED APPLICATIONS

This application is a continuation of International Application No. PCT/CN2020/131855, filed on Nov. 26, 2020, the disclosure of which is hereby incorporated by reference in its entirety.

TECHNICAL FIELD

This application relates to the communication field, and more specifically, to a security authentication method and apparatus applied to wireless fidelity (Wi-Fi).

BACKGROUND

Wi-Fi is a wireless local area network technology based on the IEEE 802.11 standard and is widely used in homes and in public places (for example, shopping malls and companies). A security protocol is the basis of Wi-Fi and is used to control who can use a network. Specifically, the Wi-Fi security protocol enables a supplicant and an access point (AP) to authenticate each other, to generate a session key and a group transient key (GTK), where the session key may be used to protect subsequent unicast communication between the supplicant and the AP, and the group transient key is used to protect broadcast communication of the AP.

In the Wi-Fi security protocol, the supplicant and the AP share a password (pw). The supplicant and the AP each can derive a pairwise master key (PMK) based on the pw. Then, the supplicant and the AP can perform identity authentication and calculate a pairwise transient key (PTK) based on the PMK, and the AP can transmit the group transient key to the supplicant. The PTK includes a transient key TK, namely, the session key.

Currently, in the Wi-Fi security protocol, all user equipment share a password, in other words, all the user equipment uses the same password to access the AP. In this case, if the password of one user equipment is compromised, the password for all of the user equipment is compromised. Consequently, the risk of the password being compromised is increased.

SUMMARY

This application provides a security authentication method and an apparatus applied to Wi-Fi, so that a first device and an AP can share a second password, and a second device and the AP can share a third password, to help prevent a password from being shared among a plurality of devices and reduce the risk of a compromised. In addition, the third password shared by the second device and the AP is obtained via the first device. In this way, in this application, the first device can manage access by the second device to the AP.

According to a first aspect, a security authentication method applied to Wi-Fi is provided. The method may be applied to an access point AP, for example, performed by the AP or a component (for example, a chip or a circuit) that may be configured in the AP.

In the method, the access point AP receives a first password input by a first device, where the first password is a password preset before delivery. When checking that the first password by the AP succeeds, the AP obtains a second password shared between the AP and the first device, and performs a 4-way handshake with the first device based on the second password. The second password is a shared key between the first device and the AP.

Then, the AP may receive a first request from the first device, where the first request is used to request a second device to access the AP; and the AP sends a third password to the first device in response to the first request, where the third password is a shared key between the second device and the AP.

Therefore, in embodiments of this application, when checking by the AP on the first password that is preset before delivery and that is input by the first device succeeds, the AP and the first device can perform a security authentication protocol based on the second password shared between the AP and the first device. Further, the first device can request the AP to connect the second device to the AP, and the AP sends, in response to the request, the third password shared by the AP and the second device to the first device. Therefore, in embodiments of this application, the first device and the AP can share the second password, and the second device and the AP can share the third password, to help prevent a password from being shared among a plurality of devices to reduce the risk of a compromised password. In addition, the third password shared by the second device and the AP is obtained via the first device. In this way, in this application, the first device can manage access by the second device to the AP.

In an example, because checking the first password sent by the first device to the AP succeeds, the first device may serve as a master device to manage another device (for example, the second device, which may be referred to as a common device), for example, authorize access by the common device to a network of the AP, or cancel access by the common device to a network of the AP, which is not limited.

In some embodiments, the AP may further store an identifier of the first device and the second password. There is a correspondence between the identifier of the first device and the second password. In this way, the second password can be bound to the identifier of the first device, to help enhance a resistance to rainbow table attacks on an AP side.

In a possible implementation, the AP may require the first device to generate the second password. For example, when checking that the first password co succeeds, the AP may send an indication message to the first device, to indicate the first device to generate the second password. After receiving the indication message, the first device may generate the second password. Then, the first device may send the second password to the AP. In this way, both the first device and the AP can obtain the second password.

In another possible implementation, the AP may generate the second password, and transmit the second password to the first device. For example, when checking the first password co succeeds, the AP may generate the second password for the first device, and send the second password to the first device. In this way, both the first device and the AP can obtain the second password.

With reference to the first aspect, in some implementations of the first aspect, performing the 4-way handshake with the first device based on the second password may be specifically implemented in the following manner:

negotiating a first pairwise master key PMK1 with the first device based on the second password and according to a twin base password encrypted key exchange (TBPEKE) protocol, and then performing the 4-way handshake with the first device based on the first PMK1.

Therefore, in embodiments of this application, a PMK with a high entropy value may be generated by performing a TBPEKE process. Therefore, embodiments of this application can help provide an offline dictionary attack resistance capability for the AP and the first device when the AP and the first device perform security authentication. In addition, because a side channel attack can be easily resisted through TBPEKE, in embodiments of this application, the PMK is generated by performing the TBPEKE, so that side channel attack resistance capabilities of the AP and the first device in a Wi-Fi security authentication process can be improved.

In some other embodiments, the AP may further negotiate a first PMK1 with the first device based on the second password and according to a simultaneous authentication of equals (SAE) protocol, and then perform the 4-way handshake with the first device based on the first PMK1. This is not limited in this application.

With reference to the first aspect, in some implementations of the first aspect, before negotiating a first pairwise master key PMK1 with the first device based on the second password and according to a twin base password encrypted key exchange TBPEKE protocol, a first hash-to-curve function $g_{mst}$ corresponding to the first device may be further determined based on the second password, where the first hash-to-curve function $g_{mst}$ is used to convert the second password into a point on an elliptic curve through a point multiplication operation. Then, an identifier of the first device and the first hash-to-curve function $g_{mst}$ are stored, where there is a correspondence between the identifier of the first device and the first hash-to-curve function $g_{mst}$.

In an example, the identifier of the first device and the first hash-to-curve function $g_{mst}$ may be stored in an account file (which may be represented as DEV-ACCT) on an AP side. For example, $\{id_{mst}, g_{mst}\}$ is added to DEV-ACCT, that is, DEV-ACCT=DEV-ACCT$_V$ $\{id_{mst}, g_{mst}\}$. Herein, $\{id_{mst}, g_{mst}\}$ may be an account established by the AP for the first device.

Therefore, in embodiments of this application, the AP may further calculate a hash-to-curve function $g_{mst}$ based on a second password $pw_{mst}$, and store an identifier $id_{mst}$ of the first device and the hash-to-curve function $g_{mst}$, so that the first device and the AP can subsequently perform security authentication by using the hash-to-curve function $g_{mst}$.

With reference to the first aspect, in some implementations of the first aspect, the first hash-to-curve function $g_{mst}$ is represented as:

$g_{mst} = U \cdot V^{h(id_{mst}, pw_{mst})}$, where

U and V are respectively two independent random generators obtained from a cyclic group G whose order is a prime number p, h( ) is a secure hash function, $id_{mst}$ represents the identifier of the first device, and $pw_{mst}$ represents the second password.

Herein, the hash-to-curve function $g_{mst}$ is obtained based on the identifier $id_{mst}$ of the first device and the second password $pw_{mst}$. In this way, the hash-to-curve function $g_{mst}$ can be bound to the identifier $id_{mst}$ of the first device, to enhance the rainbow table attack resistance capability on the AP side.

With reference to the first aspect, in some implementations of the first aspect, the first hash-to-curve function $g_{mst}$ is represented as:

$g_{mst} = U \cdot V^{h(n_{mst}, pw_{mst})}$, where

U and V are respectively two independent random generators obtained from a cyclic group G whose order is a prime number p, h( ) is a secure hash function, $n_{mst}$ is a random number, and $pw_{mst}$ represents the second password.

In other words, in embodiments of this application, the random number $n_{mst}$ may be used to replace the identifier $id_{mst}$ of the first device to calculate $g_{mst}$. In this way, the rainbow table attack resistance capability on the AP side can be enhanced.

In this implementation, the AP may further generate the random number $n_{mst}$, and may add $\{id_{mst}, n_{mst}, g_{mst}\}$ to DEV-ACCT, that is, DEV-ACCT=DEV-ACCT$_V$ $\{id_{mst}, n_{mst}, g_{mst}\}$ This is not limited in this application. In addition, the AP may send the random number $n_{mst}$ to the first device.

With reference to the first aspect, in some implementations of the first aspect, after obtaining a second password shared between the AP and the first device, it may be further determined that the first password is invalid.

In this way, when another device sends the first password co to the AP, checking the first password co does not succeed. Therefore, the AP does not determine the other device as a master device. In this way, only a limited quantity of master devices, for example, one or two master devices, may exist in a system, to help improve system security.

With reference to the first aspect, in some implementations of the first aspect, the AP may further delete the identifier of the first device and the second password, and activate the first password.

By deleting the identifier of the first device and the second password, the first device can be revoked as the master device. In addition, the first password is activated, so that when another device subsequently sends the first password to the AP, checking the first password succeeds. In this case, the AP may further determine the another device as a master device, to change the master device.

In an example, the identifier of the first device and the second password can be deleted and the first password can be activated by resetting a system of the AP. This is not limited in this application.

In some embodiments, when storing the identifier of the first device and the first hash-to-curve function $g_{mst}$, the AP may delete the identifier of the first device and the first hash-to-curve function $g_{mst}$, and activate the first password, to revoke the first device as the master device, and the AP may then determine another device as a master device, to change the master device.

In some embodiments, the AP may further store an identifier of the second device and the third password. There is a correspondence between the identifier of the second device and the third password. In this way, the third password can be bound to the identifier of the second device, to enhance the rainbow table attack resistance on the AP side.

With reference to the first aspect, in some implementations of the first aspect, the first request includes the identifier of the second device.

In some embodiments, when the first request does not include the identifier of the second device, the AP may generate the identifier of the second device. This is not limited in this application.

With reference to the first aspect, in some implementations of the first aspect, the AP may further perform the 4-way handshake with the second device based on the third password, so that the second device and the AP perform security authentication.

With reference to the first aspect, in some implementations of the first aspect, performing the 4-way handshake with the second device based on the third password may be specifically implemented in the following manner:

negotiating a second pairwise master key PMK2 with the second device based on the third password and according to the twin base password encrypted key exchange TBPEKE protocol; and then performing the 4-way handshake with the first device based on the second PMK2.

Therefore, in embodiments of this application, a PMK with a high entropy value may be generated by performing a TBPEKE process. Therefore, embodiments of this application can help provide an offline dictionary attack resistance capability for the AP and the second device when the AP and the second device perform security authentication. In addition, because a side channel attack can be easily resisted through TBPEKE, in embodiments of this application, the PMK is generated by performing TBPEKE, so that side channel attack resistance capabilities of the AP and the second device in a Wi-Fi security authentication process can be improved.

In some other embodiments, the AP may further negotiate a second PMK2 with the first device based on the second password and according to an SAE protocol, and then perform the 4-way handshake with the first device based on the second PMK2. This is not limited in this application.

With reference to the first aspect, in some implementations of the first aspect, before negotiating a second pairwise master key PMK2 with the second device based on the third password and according to the twin base password encrypted key exchange TBPEKE protocol, a second hash-to-curve function $g_T$ corresponding to the second device may be further determined based on the third password, where the second hash-to-curve function $g_T$ is used to convert the third password into a point on the elliptic curve through the point multiplication operation; and an identifier of the second device and the second hash-to-curve function $g_T$ are stored, where there is a correspondence between the identifier of the second device and the second hash-to-curve function $g_T$.

Therefore, in embodiments of this application, in the device authorization protocol process, the AP may further calculate the hash-to-curve function $g_T$ based on the third password $pw_T$, and store an identifier $id_T$ of the second device and the hash-to-curve function $g_T$, so that the second device and the AP can subsequently perform security authentication by using the hash-to-curve function $g_T$.

In an example, the identifier of the second device and the second hash-to-curve function $g_T$ may be stored in an account file (which may be represented as DEV-ACCT) on an AP side. For example, $\{id_T, g_T\}$ is added to DEV-ACCT, that is, DEV-ACCT=DEV-ACCT$_V$ $\{id_T, g_T\}$. Herein, $\{id_T, g_T\}$ may be an account established by the AP for the second device.

With reference to the first aspect, in some implementations of the first aspect, the second hash-to-curve function $g_T$ is represented as:

$$g_T = U \cdot V^{h(id_T, pw_T)}, \text{ where}$$

U and V are respectively two independent random generators obtained from a cyclic group G whose order is a prime number p, h( ) is a secure hash function, $id_T$ represents the identifier of the second device, and $pw_T$ represents the third password.

Herein, the hash-to-curve function $g_T$ is obtained based on the identifier $id_T$ of the second device and the third password $pw_T$. In this way, the hash-to-curve function $g_T$ can be bound to the identifier $id_T$ of the second device, to enhance the rainbow table attack resistance capability on an AP end.

With reference to the first aspect, in some implementations of the first aspect, the second hash-to-curve function $g_T$ is represented as:

$$g_T = U \cdot V^{h(n_T, pw_T)}, \text{ where}$$

U and V are respectively two independent random generators obtained from a cyclic group G whose order is a prime number p, h( ) is a secure hash function, $n_T$ is a random number, and $pw_T$ represents the third password.

In other words, in embodiments of this application, the random number $n_T$ may be used to replace the identifier $id_T$ of the second device to calculate gr. In this way, the rainbow table attack resistance capability on the AP side can be enhanced.

In this implementation, the AP may further generate the random number $n_T$, and may add $\{id_T, n_T, g_T\}$ to DEV-ACCT, that is, DEV-ACCT=DEV-ACCT$_V$ $\{id_T, n_T, g_T\}$. This is not limited in this application. In addition, the AP may send the random number $n_T$ to the first device, and then the first device sends the random number $n_T$ and $id_T$ to the second device. For example, the AP may send $n_T$ and $g_T$ together to the first device, and then the first device sends $n_T$, $id_T$, and $g_T$ together to the second device.

With reference to the first aspect, in some implementations of the first aspect, the identifier of the second device is a MAC address of the second device, and a data frame of the first request includes the MAC address of the second device.

In some other embodiments, the identifier of the second device may alternatively be a user name of the second device. In an example, the second device may generate the identifier of the second device, or the first device generates the identifier of the second device, or the AP may generate the identifier of the second device. This is not limited in this application.

With reference to the first aspect, in some implementations of the first aspect, the identifier of the first device is a MAC address of the first device.

The method further includes receiving the MAC address of the first device from the first device.

In some other embodiments, the identifier of the first device may alternatively be a user name of the first device. In an example, the first device may generate the identifier of the first device, or the AP generates the identifier of the first device. This is not limited in this application.

According to a second aspect, a security authentication method applied to wireless fidelity Wi-Fi is provided. The method may be applied to a first device, for example, performed by the first device or a component (for example, a chip or a circuit) that may be configured in the first device.

In the method, the first device sends a first password to an access point AP, where the first password is a password preset before delivery; and then when checking the first password by the AP succeeds, the first device obtains a second password shared between the AP and the first device, and performs a 4-way handshake with the AP based on the second password. The second password is a shared key between the first device and the AP.

Then, the first device may receive a second request from a second device, and send a first request to the AP based on the second request, where the second request is used to request to allow the second device to access the AP, and the first request is used to request the second device to access the AP. Then, the first device may receive a third password from the AP, and send the third password to the second device, where the third password is a shared key between the second device and the AP.

With reference to the second aspect, in some implementations of the second aspect, performing the 4-way handshake with the AP based on the second password may be implemented in the following manner:

negotiating a first pairwise master key PMK1 with the AP based on the second password and according to a twin base password encrypted key exchange TBPEKE protocol;

and performing the 4-way handshake with the AP based on the first PMK1.

With reference to the second aspect, in some implementations of the second aspect, before negotiating a first pairwise master key PMK1 with the AP based on the second password and according to a twin base password encrypted key exchange TBPEKE protocol, a first hash-to-curve function $g_{mst}$ corresponding to the first device may be further determined based on the second password, where the first hash-to-curve function $g_{mst}$ is used to convert the second password into a point on an elliptic curve through a point multiplication operation.

With reference to the second aspect, in some implementations of the second aspect, the first hash-to-curve function $g_{mst}$ is represented as:

$g_{mst} = U \cdot V^{h(id_{mst},pw_{mst})}$, where

U and V are respectively two independent random generators obtained from a cyclic group G whose order is a prime number p, h( ) is a secure hash function, $id_{mst}$ represents an identifier of the first device, and $pw_{mst}$ represents the second password.

With reference to the second aspect, in some implementations of the second aspect, the first hash-to-curve function $g_{mst}$ is represented as:

$g_{mst} = U \cdot V^{h(n_{mst},pw_{mst})}$, where

U and V are respectively two independent random generators obtained from a cyclic group G whose order is a prime number p, h( ) is a secure hash function, $n_{mst}$ is a random number, and $pw_{mst}$ represents the second password.

With reference to the second aspect, in some implementations of the second aspect, the first request includes an identifier of the second device, and the second request includes the identifier of the second device.

With reference to the second aspect, in some implementations of the second aspect, the identifier of the second device is a MAC address of the second device.

According to a third aspect, a security authentication method applied to wireless fidelity Wi-Fi is provided. The method may be applied to a second device, for example, performed by the second device or a component (for example, a chip or a circuit) that may be configured in the second device.

In the method, the second device sends a second request to a first device, where the second request is used to request to allow the second device to access the AP. Then, the second device receives a third password from the first device, where the third password is a shared key that is generated by the AP and that is between the second device and the AP.

With reference to the third aspect, in some implementations of the third aspect, the second device may perform the 4-way handshake with the AP based on the third password, so that the second device and the AP perform security authentication.

With reference to the third aspect, in some implementations of the third aspect, performing the 4-way handshake with the AP based on the third password may be implemented in the following manner:

negotiating a second pairwise master key PMK2 with the AP based on the third password and according to a twin base password encrypted key exchange TBPEKE protocol; and performing the 4-way handshake with the AP based on the second PMK2.

With reference to the third aspect, in some implementations of the third aspect, before negotiating a second pairwise master key PMK2 with the AP based on the third password and according to a twin base password encrypted key exchange TBPEKE protocol, a second hash-to-curve function $g_T$ corresponding to the second device may be further determined based on the third password, where the second hash-to-curve function $g_T$ is used to convert the third password into a point on an elliptic curve through a point multiplication operation.

With reference to the third aspect, in some implementations of the third aspect, the second hash-to-curve function $g_T$ is represented as:

$g_T = U \cdot V^{h(id_T,pw_T)}$, where

U and V are respectively two independent random generators obtained from a cyclic group G whose order is a prime number p, h( ) is a secure hash function, $id_T$ represents an identifier of the first device, and $pw_T$ represents the third password.

With reference to the third aspect, in some implementations of the third aspect, the second hash-to-curve function $g_T$ is represented as:

$g_T = U \cdot V^{h(n_T,pw_T)}$, where

U and V are respectively two independent random generators obtained from a cyclic group G whose order is a prime number p, h( ) is a secure hash function, $n_T$ is a random number, and $pw_T$ represents the third password.

With reference to the third aspect, in some implementations of the third aspect, the second request includes an identifier of the second device.

With reference to the third aspect, in some implementations of the third aspect, the identifier of the second device is a MAC address of the second device.

According to a fourth aspect, a security authentication apparatus applied to wireless fidelity Wi-Fi is provided, and is configured to perform the method according to the first aspect or any possible implementation of the first aspect. Specifically, the apparatus includes a unit or module configured to perform the method in the first aspect or any possible implementation of the first aspect. For example, the apparatus includes a processing unit and a transceiver unit.

The transceiver unit is configured to receive a first password input by a first device, where the first password is a password preset before delivery.

The processing unit is configured to obtain, when checking the first password by the AP succeeds, a second password shared between the AP and the first device, where the second password is a shared key between the first device and the AP.

The processing unit is further configured to perform the 4-way handshake with the first device based on the second password.

The transceiver unit is further configured to receive a first request from the first device, where the first request is used to request a second device to access the AP.

The processing unit is further configured to control the transceiver unit to send a third password to the first device in response to the first request, where the third password is a shared key between the second device and the AP.

With reference to the fourth aspect, in some implementations of the fourth aspect, the processing unit is specifically configured to:

negotiate a first pairwise master key PMK1 with the first device based on the second password and according to a twin base password encrypted key exchange TBPEKE protocol, and perform the 4-way handshake with the first device based on the first PMK1.

With reference to the fourth aspect, in some implementations of the fourth aspect, the processing unit is further configured to:

determine a first hash-to-curve function $g_{mst}$ corresponding to the first device based on the second password, where the first hash-to-curve function $g_{mst}$ is used to convert the second password into a point on an elliptic curve through a point multiplication operation; and store an identifier of the first device and the first hash-to-curve function $g_{mst}$, where there is a correspondence between the identifier of the first device and the first hash-to-curve function $g_{mst}$.

With reference to the fourth aspect, in some implementations of the fourth aspect, the first hash-to-curve function $g_{mst}$ is represented as:

$$g_{mst}=U \cdot V^{h(id_{mst}, pw_{mst})}, \text{ where}$$

U and V are respectively two independent random generators obtained from a cyclic group G whose order is a prime number p, h( ) is a secure hash function, $id_{mst}$ represents the identifier of the first device, and $pw_{mst}$ represents the second password.

With reference to the fourth aspect, in some implementations of the fourth aspect, the first hash-to-curve function $g_{mst}$ is represented as:

$$g_{mst}=U \cdot V^{h(n_{mst}, pw_{mst})}, \text{ where}$$

U and V are respectively two independent random generators obtained from a cyclic group G whose order is a prime number p, h( ) is a secure hash function, $n_{mst}$ is a random number, and $pw_{mst}$ represents the second password.

With reference to the fourth aspect, in some implementations of the fourth aspect, the processing unit is further configured to determine that the first password is invalid.

With reference to the fourth aspect, in some implementations of the fourth aspect, the processing unit is further configured to delete the identifier of the first device and the second password, and activate the first password.

With reference to the fourth aspect, in some implementations of the fourth aspect, the processing unit is further configured to perform the 4-way handshake with the second device based on the third password.

With reference to the fourth aspect, in some implementations of the fourth aspect, the processing unit is specifically configured to:

negotiate a second pairwise master key PMK2 with the second device based on the third password and according to the twin base password encrypted key exchange TBPEKE protocol; and perform the 4-way handshake with the first device based on the second PMK2.

With reference to the fourth aspect, in some implementations of the fourth aspect, the processing unit is further configured to determine a second hash-to-curve function $g_T$ corresponding to the second device based on the third password, where the second hash-to-curve function $g_T$ is used to convert the third password into a point on the elliptic curve through the point multiplication operation; and store an identifier of the second device and the second hash-to-curve function $g_T$, where there is a correspondence between the identifier of the second device and the second hash-to-curve function $g_T$.

With reference to the fourth aspect, in some implementations of the fourth aspect, the second hash-to-curve function $g_T$ is represented as:

$$g_T=U \cdot V^{h(id_T, pw_T)}, \text{ where}$$

U and V are respectively two independent random generators obtained from a cyclic group G whose order is a prime number p, h( ) is a secure hash function, $id_T$ represents the identifier of the second device, and $pw_T$ represents the third password.

With reference to the fourth aspect, in some implementations of the fourth aspect, the second hash-to-curve function $g_T$ is represented as:

$$g_T=U \cdot V^{h(n_T, pw_T)}, \text{ where}$$

U and V are respectively two independent random generators obtained from a cyclic group G whose order is a prime number p, h( ) is a secure hash function, $n_T$ is a random number, and $pw_T$ represents the third password.

With reference to the fourth aspect, in some implementations of the fourth aspect, the first request includes the identifier of the second device.

With reference to the fourth aspect, in some implementations of the fourth aspect, the identifier of the second device is a MAC address of the second device.

According to a fifth aspect, a security authentication apparatus applied to wireless fidelity Wi-Fi is provided, and is configured to perform the method according to the second aspect or any possible implementation of the second aspect. Specifically, the apparatus includes a unit or module configured to perform the method in the second aspect or any possible implementation of the second aspect. For example, the apparatus includes a processing unit and a transceiver unit.

The transceiver unit is configured to send a first password to an access point AP, where the first password is a password preset before delivery.

The processing unit is configured to obtain, when checking the first password by the AP succeeds, a second password shared between the AP and the first device, where the second password is a shared key between the first device and the AP.

The processing unit is further configured to perform the 4-way handshake with the AP based on the second password.

The transceiver unit is further configured to receive a second request from a second device, where the second request is used to request to allow the second device to access the AP.

The processing unit is further configured to control the transceiver unit to send a first request to the AP in response to the second request, where the first request is used to request the second device to access the AP.

The transceiver unit is further configured to receive a third password from the AP, where the third password is a shared key between the second device and the AP.

The transceiver unit is further configured to send the third password to the second device.

With reference to the fifth aspect, in some implementations of the fifth aspect, the processing unit is specifically configured to:

negotiate a first pairwise master key PMK1 with the AP based on the second password and according to a twin base password encrypted key exchange TBPEKE protocol;

and perform, by the first device, the 4-way handshake with the AP based on the first PMK1.

With reference to the fifth aspect, in some implementations of the fifth aspect, the processing unit is further configured to determine a first hash-to-curve function $g_{mst}$ corresponding to the first device based on the second password, where the first hash-to-curve function $g_{mst}$ is used to convert the second password into a point on an elliptic curve through a point multiplication operation.

With reference to the fifth aspect, in some implementations of the fifth aspect, the first hash-to-curve function $g_{mst}$ is represented as:

$$g_{mst} = U \cdot V^{h(id_{mst}, pw_{mst})}, \text{ where}$$

U and V are respectively two independent random generators obtained from a cyclic group G whose order is a prime number p, h( ) is a secure hash function, $id_{mst}$ represents an identifier of the first device, and $pw_{mst}$ represents the second password.

With reference to the fifth aspect, in some implementations of the fifth aspect, the first hash-to-curve function $g_{mst}$ is represented as:

$$g_{mst} = U \cdot V^{h(n_{mst}, pw_{mst})}, \text{ where}$$

U and V are respectively two independent random generators obtained from a cyclic group G whose order is a prime number p, h( ) is a secure hash function, $n_{mst}$ is a random number, and $pw_{mst}$ represents the second password.

With reference to the fifth aspect, in some implementations of the fifth aspect, the first request includes an identifier of the second device, and the second request includes the identifier of the second device.

With reference to the fifth aspect, in some implementations of the fifth aspect, the identifier of the second device is a MAC address of the second device.

According to a sixth aspect, a security authentication apparatus applied to wireless fidelity Wi-Fi is provided, and is configured to perform the method according to the third aspect or any possible implementation of the third aspect. Specifically, the apparatus includes a unit or module configured to perform the method in the third aspect or any possible implementation of the third aspect. For example, the apparatus includes a processing unit and a transceiver unit.

The transceiver unit is configured to send a second request to a first device, where the second request is used to request to allow the second device to access the AP.

The transceiver unit is further configured to receive a third password from the first device, where the third password is a shared key that is generated by the AP and that is between the second device and the AP.

With reference to the sixth aspect, in some implementations of the sixth aspect, the processing unit is further configured to perform the 4-way handshake with the AP based on the third password.

With reference to the sixth aspect, in some implementations of the sixth aspect, the processing unit is specifically configured to negotiate a second pairwise master key PMK2 with the AP based on the third password and according to a twin base password encrypted key exchange TBPEKE protocol; and perform the 4-way handshake with the AP based on the second PMK2.

With reference to the sixth aspect, in some implementations of the sixth aspect, the processing unit is further configured to determine a second hash-to-curve function $g_T$ corresponding to the second device based on the third password, where the second hash-to-curve function $g_T$ is used to convert the third password into a point on an elliptic curve through a point multiplication operation.

With reference to the sixth aspect, in some implementations of the sixth aspect, the second hash-to-curve function $g_T$ is represented as:

$$g_T = U \cdot V^{h(id_T, pw_T)}, \text{ where}$$

U and V are respectively two independent random generators obtained from a cyclic group G whose order is a prime number p, h( ) is a secure hash function, $id_T$ represents an identifier of the first device, and $pw_T$ represents the third password.

With reference to the sixth aspect, in some implementations of the sixth aspect, the second hash-to-curve function $g_T$ is represented as:

$$g_T = U \cdot V^{h(n_T, pw_T)}, \text{ where}$$

U and V are respectively two independent random generators obtained from a cyclic group G whose order is a prime number p, h( ) is a secure hash function, $n_T$ is a random number, and $pw_T$ represents the third password.

With reference to the sixth aspect, in some implementations of the sixth aspect, the second request includes an identifier of the second device.

With reference to the sixth aspect, in some implementations of the sixth aspect, the identifier of the second device is a MAC address of the second device.

According to a seventh aspect, a security authentication apparatus applied to wireless fidelity Wi-Fi is provided, including: a processor and a transceiver, where the processor is coupled to the transceiver. Optionally, the apparatus may further include a memory. The memory is configured to store instructions, the processor is configured to execute the instructions stored in the memory, and when the processor executes the instructions stored in the memory, the execution enables the processor to perform the method according to the first aspect or any possible implementation of the first aspect.

The transceiver is configured to receive a first password input by a first device, where the first password is a password preset before delivery.

The processor is configured to obtain, when checking the first password by the AP succeeds, a second password shared between the AP and the first device, where the second password is a shared key between the first device and the AP.

The processor is further configured to perform the 4-way handshake with the first device based on the second password.

The transceiver is further configured to receive a first request from the first device, where the first request is used to request a second device to access the AP.

The processor is further configured to control the transceiver to send a third password to the first device in response to the first request, where the third password is a shared key between the second device and the AP.

With reference to the seventh aspect, in some implementations of the seventh aspect, the processor is specifically configured to:

negotiate a first pairwise master key PMK1 with the first device based on the second password and according to a twin base password encrypted key exchange TBPEKE protocol;

and perform the 4-way handshake with the first device based on the first PMK1.

With reference to the seventh aspect, in some implementations of the seventh aspect, the processor is further configured to:

determine a first hash-to-curve function $g_{mst}$ corresponding to the first device based on the second password, where the first hash-to-curve function $g_{mst}$ is used to convert the second password into a point on an elliptic curve through a point multiplication operation; and store an identifier of the first device and the first hash-to-curve function $g_{mst}$, where there is a correspondence between the identifier of the first device and the first hash-to-curve function $g_{mst}$.

With reference to the seventh aspect, in some implementations of the seventh aspect, the first hash-to-curve function $g_{mst}$ is represented as:

$$g_{mst}=U\cdot V^{h(id_{mst},pw_{mst})}, \text{where}$$

U and V are respectively two independent random generators obtained from a cyclic group G whose order is a prime number p, h( ) is a secure hash function, $id_{mst}$ represents an identifier of the first device, and $pw_{mst}$ represents the second password.

With reference to the seventh aspect, in some implementations of the seventh aspect, the first hash-to-curve function $g_{mst}$ is represented as:

$$g_{mst}=U\cdot V^{h(n_{mst},pw_{mst})}, \text{where}$$

U and V are respectively two independent random generators obtained from a cyclic group G whose order is a prime number p, h( ) is a secure hash function, $n_{mst}$ is a random number, and $pw_{mst}$ represents the second password.

With reference to the seventh aspect, in some implementations of the seventh aspect, the processor is further configured to determine that the first password is invalid.

With reference to the seventh aspect, in some implementations of the seventh aspect, the processor is further configured to delete the identifier of the first device and the second password, and activate the first password.

With reference to the seventh aspect, in some implementations of the seventh aspect, the processor is further configured to perform the 4-way handshake with the second device based on the third password.

With reference to the seventh aspect, in some implementations of the seventh aspect, the processor is specifically configured to negotiate a second pairwise master key PMK2 with the second device based on the third password and according to the twin base password encrypted key exchange TBPEKE protocol; and perform the 4-way handshake with the first device based on the second PMK2.

With reference to the seventh aspect, in some implementations of the seventh aspect, the processor is further configured to determine a second hash-to-curve function $g_T$ corresponding to the second device based on the third password, where the second hash-to-curve function $g_T$ is used to convert the third password into a point on the elliptic curve through the point multiplication operation; and store an identifier of the second device and the second hash-to-curve function $g_T$, where there is a correspondence between the identifier of the second device and the second hash-to-curve function $g_T$.

With reference to the seventh aspect, in some implementations of the seventh aspect, the second hash-to-curve function $g_T$ is represented as:

$$g_T=U\cdot V^{h(id_T,pw_T)}, \text{where}$$

U and V are respectively two independent random generators obtained from a cyclic group G whose order is a prime number p, h( ) is a secure hash function, $id_T$ represents the identifier of the second device, and $pw_T$ represents the third password.

With reference to the seventh aspect, in some implementations of the seventh aspect, the second hash-to-curve function $g_T$ is represented as:

$$g_T=U\cdot V^{h(n_T,pw_T)}, \text{where}$$

U and V are respectively two independent random generators obtained from a cyclic group G whose order is a prime number p, h( ) is a secure hash function, $n_T$ is a random number, and $pw_T$ represents the third password.

With reference to the seventh aspect, in some implementations of the seventh aspect, the first request includes the identifier of the second device.

With reference to the seventh aspect, in some implementations of the seventh aspect, the identifier of the second device is a MAC address of the second device.

According to an eighth aspect, a security authentication apparatus applied to wireless fidelity Wi-Fi is provided, including: a processor and a transceiver, where the processor is coupled to the transceiver. Optionally, the apparatus may further include a memory. The memory is configured to store instructions, the processor is configured to execute the instructions stored in the memory, and when the processor executes the instructions stored in the memory, the execution enables the processor to perform the method according to the second aspect or any possible implementation of the second aspect.

The transceiver is configured to send a first password to an access point AP, where the first password is a password preset before delivery.

The processor is configured to obtain, when checking the first password by the AP succeeds, a second password shared between the AP and the first device, where the second password is a shared key between the first device and the AP.

The processor is configured to perform the 4-way handshake with the AP based on the second password.

The transceiver is configured to receive a second request from a second device, where the second request is used to request to allow the second device to access the AP.

The transceiver is configured to send a first request to the AP in response to the second request, where the first request is used to request the second device to access the AP.

The transceiver is configured to receive a third password from the AP, where the third password is a shared key between the second device and the AP.

The transceiver is configured to send the third password to the second device.

With reference to the eighth aspect, in some implementations of the eighth aspect, the processor is specifically configured to negotiate a first pairwise master key PMK1 with the AP based on the second password and according to a twin base password encrypted key exchange TBPEKE protocol; and perform the 4-way handshake with the AP based on the first PMK1.

With reference to the eighth aspect, in some implementations of the eighth aspect, the processor is further configured to determine a first hash-to-curve function $g_{mst}$ corresponding to the first device based on the second password, where the first hash-to-curve function $g_{mst}$ is used to convert the second password into a point on an elliptic curve through a point multiplication operation.

With reference to the eighth aspect, in some implementations of the eighth aspect, the first hash-to-curve function $g_{mst}$ is represented as:

$$g_{mst}=U \cdot V^{h(id_{mst},pw_{mst})}, \text{ where}$$

U and V are respectively two independent random generators obtained from a cyclic group G whose order is a prime number p, h( ) is a secure hash function, $id_{mst}$ represents an identifier of the first device, and $pw_{mst}$ represents the second password.

With reference to the eighth aspect, in some implementations of the eighth aspect, the first hash-to-curve function $g_{mst}$ is represented as:

$$g_{mst}=U \cdot V^{h(n_{mst},pw_{mst})}, \text{ where}$$

U and V are respectively two independent random generators obtained from a cyclic group G whose order is a prime number p, h( ) is a secure hash function, $n_{mst}$ is a random number, and $pw_{mst}$ represents the second password.

With reference to the eighth aspect, in some implementations of the eighth aspect, the first request includes an identifier of the second device, and the second request includes the identifier of the second device.

With reference to the eighth aspect, in some implementations of the eighth aspect, the identifier of the second device is a MAC address of the second device.

According to a ninth aspect, a security authentication apparatus applied to wireless fidelity Wi-Fi is provided, including: a processor and a transceiver, where the processor is coupled to the transceiver. Optionally, the apparatus may further include a memory. The memory is configured to store instructions, the processor is configured to execute the instructions stored in the memory, and when the processor executes the instructions stored in the memory, the execution enables the processor to perform the method according to the third aspect or any possible implementation of the third aspect.

The transceiver is configured to send a second request to a first device, where the second request is used to request to allow the second device to access the AP.

The transceiver is further configured to receive a third password from the first device, where the third password is a shared key that is generated by the AP and that is between the second device and the AP.

With reference to the ninth aspect, in some implementations of the ninth aspect, the processor is configured to perform the 4-way handshake with the AP based on the third password.

With reference to the ninth aspect, in some implementations of the ninth aspect, the processor is specifically configured to negotiate a second pairwise master key PMK2 with the AP based on the third password and according to a twin base password encrypted key exchange TBPEKE protocol; and perform the 4-way handshake with the AP based on the second PMK2.

With reference to the ninth aspect, in some implementations of the ninth aspect, the processor is further configured to determine a second hash-to-curve function $g_T$ corresponding to the second device based on the third password, where the second hash-to-curve function $g_T$ is used to convert the third password into a point on an elliptic curve through a point multiplication operation.

With reference to the ninth aspect, in some implementations of the ninth aspect, the second hash-to-curve function $g_T$ is represented as:

$$g_T=U \cdot V^{h(id_T,pw_T)}, \text{ where}$$

U and V are respectively two independent random generators obtained from a cyclic group G whose order is a prime number p, h( ) is a secure hash function, $id_T$ represents an identifier of the first device, and $pw_T$ represents the third password.

With reference to the ninth aspect, in some implementations of the ninth aspect, the second hash-to-curve function $g_T$ is represented as:

$$g_T=U \cdot V^{h(n_T,pw_T)}, \text{ where}$$

U and V are respectively two independent random generators obtained from a cyclic group G whose order is a prime number p, h( ) is a secure hash function, $n_T$ is a random number, and $pw_T$ represents the third password.

With reference to the ninth aspect, in some implementations of the ninth aspect, the second request includes an identifier of the second device.

With reference to the ninth aspect, in some implementations of the ninth aspect, the identifier of the second device is a MAC address of the second device.

According to a tenth aspect, a chip is provided. The chip includes a processor and a communication interface. The processor is configured to invoke instructions from the communication interface and run the instructions. When the processor executes the instructions, the method in any one of the first aspect to the third aspect or any possible implementation of any aspect is implemented.

Optionally, the communication chip may further include a memory. The memory stores instructions. The processor is configured to execute the instructions stored in the memory or other instructions. When the instructions are executed, the processor is configured to implement the method in any one of the first aspect to the third aspect or any possible implementation of any aspect.

According to an eleventh aspect, a computer-readable medium is provided. The computer-readable medium is configured to store a computer program, and the computer program includes instructions used to perform the method according to any one of the first aspect to the third aspect or any possible implementation of any aspect.

According to a twelfth aspect, an embodiment of this application further provides a computer program product including instructions. When the computer program product runs on a computer, the computer is enabled to perform the method according to any one of the first aspect to the third aspect or any possible implementation of any aspect.

According to a thirteenth aspect, a communication system is provided. The communication system includes an apparatus that has a function of implementing the method and various possible designs according to the first aspect, an apparatus that has a function of implementing the method and various possible designs according to the second aspect, and an apparatus that has a function of implementing the method and various possible designs according to the third aspect.

It should be understood that for beneficial effects achieved in the second aspect to the thirteenth aspect and the corresponding implementations of this application, refer to the beneficial effects achieved in the first aspect and the corresponding implementations of this application. Details are not described again.

BRIEF DESCRIPTION OF DRAWINGS

FIG. 5 is an example of a TBPEKE process;

DESCRIPTION OF EMBODIMENTS

First, related terms in embodiments of this application are described.

Brute force cracking (that is, an offline dictionary attack): An offline dictionary for a password means that a length of a password is short and value space is small. Therefore, attackers can guess all possible passwords repeatedly and compare the passwords with stolen communication information to determine a correct password.

Rainbow table attack: In a system that uses passwords for authentication, a server does not directly store a password of each user, but stores a hash function value of the password of each user. The goal is to prevent the attackers from directly obtaining passwords of all users after they break through the server. The rainbow table attack means that an attacker may create a table (a rainbow table) in advance to store all possible passwords and hash function values corresponding to the passwords. After attacking the server, the attacker may determine a password of a user by comparing the hash function values in the rainbow table with the hash function values stored in the server.

The following describes technical solutions of this application with reference to accompanying drawings.

Figure 1:
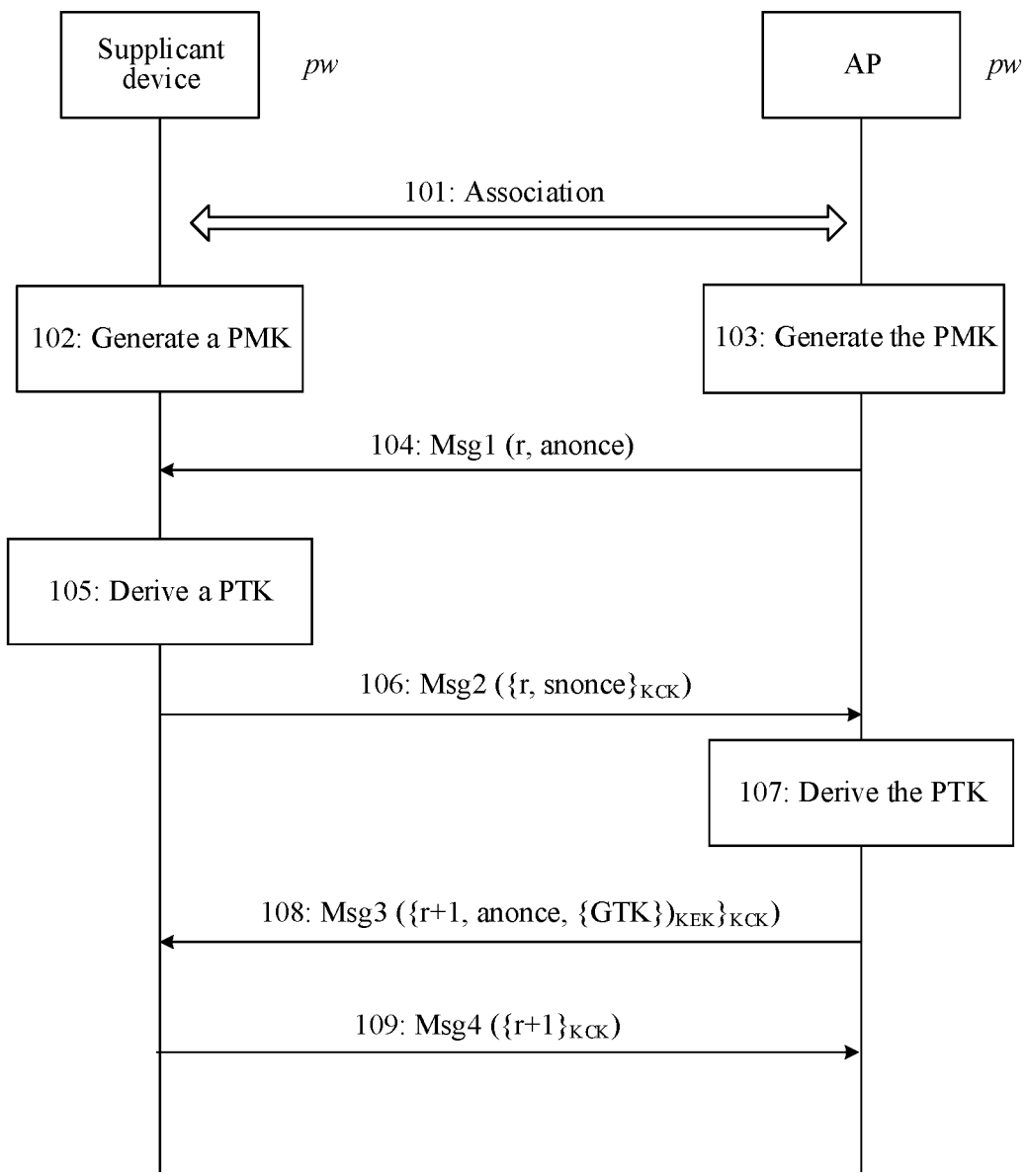
FIG. 1 is a schematic flowchart of a Wi-Fi-based security authentication method.

FIG. 1 is a schematic flowchart of a Wi-Fi-based security authentication method 100. In FIG. 1, a Wi-Fi security protocol may be a second generation Wi-Fi protected access (Wi-Fi protected access 2, WPA2) version, or a version earlier than WPA2, for example, wired equivalent privacy (WEP), second generation WEP (WEP2), or WPA. This is not limited.

A process shown in FIG. 1 may also be referred to as a security protocol process. As shown in FIG. 1, the method 100 is performed by a supplicant device (or may be replaced with a supplicant) and an AP. The AP may provide a network according to a Wi-Fi protocol, and the supplicant device is a terminal device that requests to use the network provided by the AP. The AP and the supplicant device share a password pw. Refer to FIG. 1. The method 100 may include step 101 to step 109. Step 104 to step 109 may be referred to as a 4-way handshake process.

101: The supplicant device is associated with the AP. Herein, the supplicant device and the AP may negotiate a to-be-used security suite through association. For example, the security suite may indicate a related encryption algorithm used between the supplicant device and the AP and another related parameter.

102: The supplicant device generates a PMK. For example, the supplicant device may deduce the PMK based on the pw shared by the supplicant device and the AP. Optionally, the supplicant device may further obtain the PMK based on media access control (MAC) addresses of the supplicant device and the AP. This is not limited in this application.

103: The AP generates the PMK. For example, the AP may deduce the PMK based on the pw shared by the supplicant device and the AP. Optionally, the AP may further obtain the PMK based on the MAC addresses of the supplicant device and the AP. This is not limited in this application.

In some embodiments, when the PMK generated by the supplicant device is the same as the PMK generated by the AP, the AP and the first device may perform the 4-way handshake based on the PMK.

104: The AP sends Msg1 (r, anonce) to the supplicant device. Correspondingly, the supplicant device receives Msg1 (r, anonce). Herein, Msg1 represents a message 1, anonce represents a one-time random number of the AP, and r represents a count of a counter.

105: The supplicant device derives a PTK.

For example, the supplicant device may select a one-time random number (which is represented as snonce), and generate the PTK based on the PMK, anonce, and snonce. Optionally, the supplicant device may further generate the PTK based on the PMK, anonce, snonce, and the MAC addresses of the supplicant device and the AP. This is not limited in this application.

For example, the PTK includes three parts: a key confirmation key (KCK), a key encryption key (KEK), and a transient key (TK). The KCK is used to protect message privacy in the 4-way handshake process, the KEK is used to protect message integrity in the 4-way handshake process, and the TK is a true session key and is used to protect subsequent communications between the supplicant device and the AP.

106: The supplicant device sends Msg2 ($\{r, snonce\}_{KCK}$) to the AP. Correspondingly, the AP receives Msg2 ($\{r, snonce\}_{KCK}$). Herein, Msg2 represents a message 2, and message integrity of Msg2 is protected by using the KCK.

107: The AP derives the PTK.

For example, the AP may generate the PTK based on the PMK, anonce, and snonce. Optionally, the AP may further generate the PTK based on the PMK, anonce, snonce, and the MAC addresses of the supplicant device and the AP. This is not limited in this application.

In some embodiments, the PTK generated by the supplicant device is the same as the PTK generated by the AP. When the PTK generated by the supplicant device is the same as the PTK generated by the AP, the following process is performed.

108: The AP sends Msg3 ($\{r+1, anonce, \{GTK\}_{KEK}\}_{KCK}$) to the supplicant device. Correspondingly, the AP receives Msg3 ($\{r+1, anonce, \{GTK\}_{KEK}\}_{KCK}$). Herein, Msg3 represents a message 3, and the GTK is a group transient key.

Privacy of the GTK of Msg3 is protected by using the KEK, and message integrity of entire Msg3 is protected by using the KCK.

109: The supplicant device sends Msg4 ($\{r+1\}_{KCK}$) to the AP. Correspondingly, the AP receives Msg4 ($\{r+1\}_{KCK}$). Herein, Msg4 represents a message 4. Message integrity of Msg4 is protected by using the KCK.

Specifically, for step 101 to step 108, refer to the descriptions in the conventional technology. Details are not described again.

It can be learned from the foregoing descriptions that, the AP and the supplicant device may perform identity authentication in the 4-way handshake process, and generate a session key and a group transient key, to protect subsequent unicast communication between the supplicant device and the AP and broadcast communication of the AP.

In the method 100, the PMK is calculated by using the password pw (or the MAC addresses of both parties), and an outstanding feature of the password pw is that the password pw has a small length, that is, has a low entropy value. Consequently, if an attacker intercepts a 4-way handshake message during key generation, the attacker may obtain a password through brute force cracking, which threatens network security.

To resolve a potential risk that an attacker may perform brute force cracking on the password pw in the WPA2 and earlier Wi-Fi security protocol versions, in a WPA3 version, before a conventional security protocol process (for example, association and a 4-way handshake process), an SAE process is performed to generate a PMK with a high entropy value, to help avoid brute force cracking of the password. The SAE is a password-based password authenticated and key exchange (PAKE) protocol.

Figure 2:
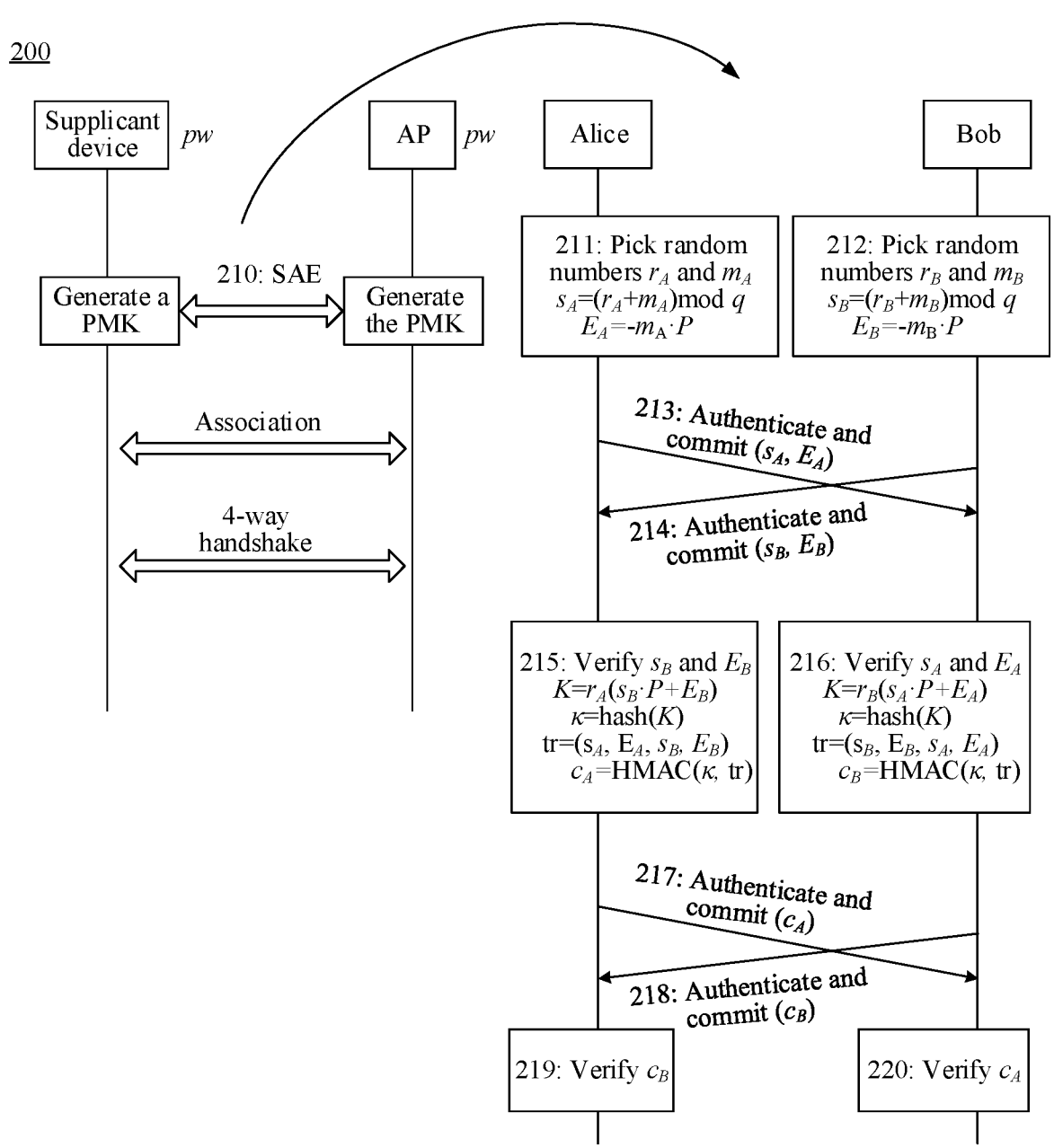
FIG. 2 is a schematic flowchart of a WPA3-based security authentication method.

FIG. 2 is a schematic flowchart of a WPA3-based security authentication method 200. The method 200 may include generation of a PMK by a supplicant device and an AP, association, and a 4-way handshake process. A difference from the method 100 is that in FIG. 2, a PMK with a high entropy value is generated by performing an SAE process (that is, step 210), where SAE is implemented on an elliptic curve. In an example, in FIG. 2, an example in which Alice (for example, a client) and Bob (for example, an AP) perform the SAE process is used for description. As shown in FIG. 2, step 210 includes step 211 to step 220.

211: Alice picks random numbers $r_A$ and $m_A$, and calculates $s_A=(r_A+m_A)\mod q$ and $E_A=-m_A \cdot P$.

212: Bob picks random numbers $r_B$ and $n_B$, and calculates $s_B=(r_B+m_B)\mod q$, and $E_B=-m_B \cdot P$.

P is a point on a corresponding elliptic curve, and P may be generated through derivation by using the password pw and the MAC addresses of the supplicant and the AP. Herein, a calculation process of generating P by using the password pw may be referred to as a hash-to-curve function.

213: Alice authenticates and commits (auth-commit) ($s_A$, $E_A$) to Bob.

214: Bob authenticates and commits (auth-commit) ($s_B$, $E_B$) to Alice.

215: Alice verifies $s_B$ and $E_B$, and calculates $K=r_A(s_B \cdot P+E_B)$, $\kappa=\text{hash}(K)$, $tr=(s_A, E_A, s_B, E_B)$, and $c_A=\text{HMAC}(\kappa, tr)$. $\kappa=\text{hash}(K)$ may be used as a PMK.

216: Bob verifies $s_A$ and $E_A$, and calculates $K=r_B(s_A \cdot P+E_A)$, $\kappa=\text{hash}(K)$, $tr=(s_B, E_B, s_A, E_A)$, and $c_B=\text{HMAC}(\kappa, tr)$. $\kappa=\text{hash}(K)$ may be used as the PMK.

217: Alice authenticates and commits $c_A$ to Bob.

218: Bob authenticates and commits $c_B$ to Alice.

219: Alice verifies $c_B$.

220: Bob verifies $c_A$.

After the verification on both $c_B$ and $c_A$ succeeds in step 219 and step 220, Alice and Bob may use the $\kappa$ value calculated by Alice and Bob as the PMK.

Therefore, before the conventional security protocol process (for example, association and the 4-way handshake process), the SAE process is performed to generate a PMK with a high entropy value, which can help reduce or even avoid a possibility that brute force cracking is performed on a password.

However, in a current Wi-Fi security protocol, all supplicant devices share a password, that is, all the supplicant devices access the AP (that is, are connected to the network provided by the AP) by using a same password. Consequently, a compromised password of one supplicant device compromises the password of all the supplicant devices.

In view of this, an embodiment of this application provides a communication solution. When a plurality of supplicant devices are connected to the network provided by the AP, different supplicant devices perform security authentication with the AP by using different passwords, that is, one device corresponds to one password. In this way, compromising a password of a supplicant device does not affect the passwords of other devices.

Figure 3:
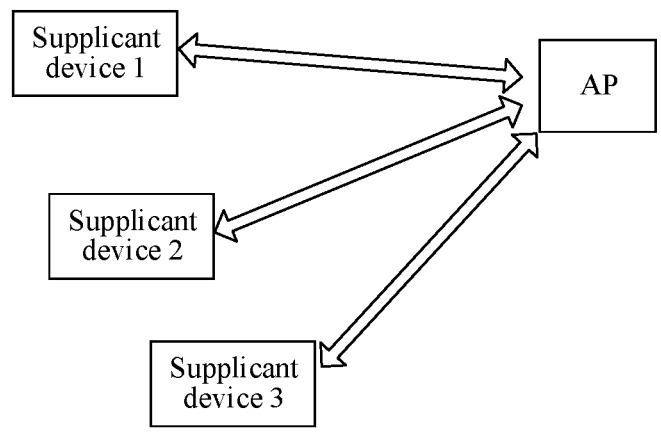
FIG. 3 is a schematic diagram of an application scenario according to an embodiment of this application.

FIG. 3 is a schematic diagram of a system according to an embodiment of this application. As shown in FIG. 3, a plurality of supplicant devices (for example, a supplicant device 1, a supplicant device 2, and a supplicant device 3) may be securely connected to an AP, and use Wi-Fi network resources via the AP. Each supplicant device and the AP perform a security protocol, perform mutual authentication, and negotiate a key for protecting a communication channel between the supplicant device and the AP. Herein, when performing the security protocol with the AP, different supplicant devices perform the security protocol with the AP by using different passwords. Before performing the security protocol with the AP by using a password of each supplicant device, each supplicant device needs to establish, with the AP, a password shared by the supplicant device and the AP.

It should be understood that FIG. 3 shows an example of a system applied to an embodiment of this application, but this application is not limited thereto. For example, one, two, four, or more supplicant devices may be connected to the AP, and these all fall within the protection scope of embodiments of this application.

With reference to the accompanying drawings, the following describes in detail a security authentication method and apparatus applied to Wi-Fi provided in this application.

The technical solution of this application may be applied to a wireless communication system, for example, the communication system shown in FIG. 3. There may be a wireless communication connection relationship among apparatuses in the wireless communication system. One of the apparatuses may be, for example, an AP or a chip configured in the AP. Another apparatus may be, for example, a first device or a chip configured in the first device. Another apparatus may be, for example, a second device or a chip configured in the second device. This is not limited in embodiments of this application.

The following describes embodiments of this application in detail by using a communication process among the AP, the first device, and the second device as an example. It may be understood that the chip configured in the AP, the chip configured in the first device, and the chip configured in the second device may all perform communication based on a same method. This is not limited in this application.

Figure 4:
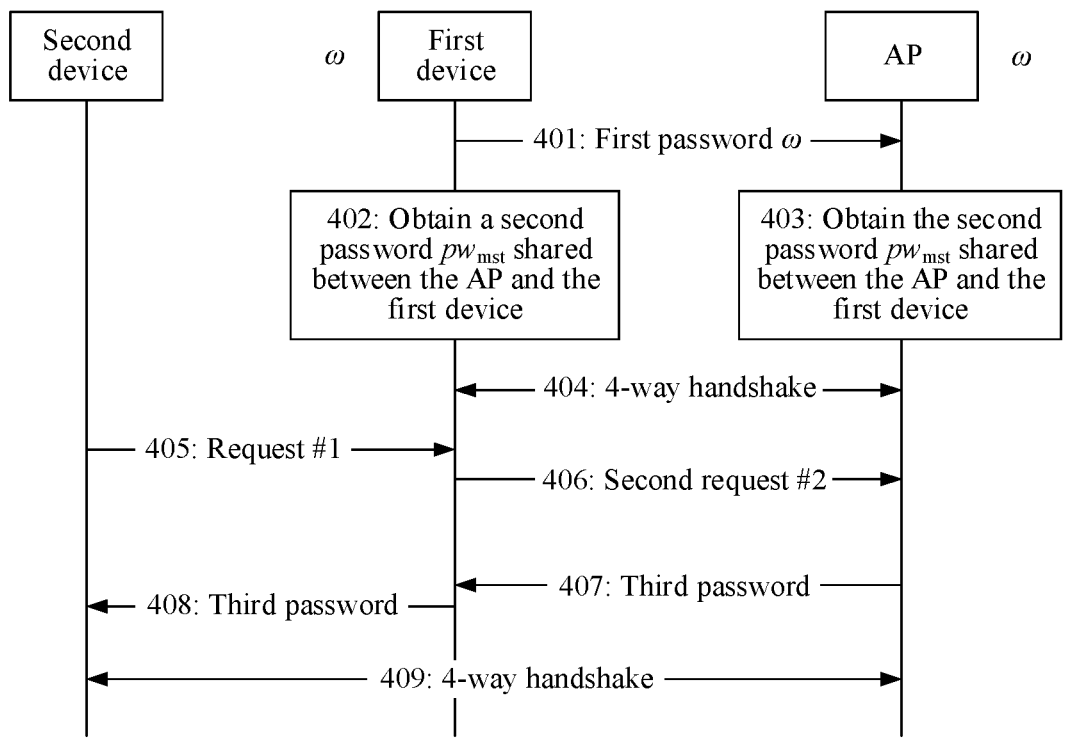
FIG. 4 is a schematic flowchart of a security authentication method applied to Wi-Fi according to an embodiment of this application.

FIG. 4 is a schematic flowchart of a security authentication method 400 applied to Wi-Fi according to an embodiment of this application. As shown in FIG. 4, the method 400 includes step 401 to step 409.

For example, Wi-Fi security protocols used in the method 400 may include three protocols: a master device determining protocol, a device authorization protocol, and a device authentication protocol. Step 401 to step 403 may correspond to the master device determining protocol, in other words, it may be determined, in step 401 to step 403, that a first device is determined as a master device. Step 404 may correspond to the device authentication protocol, in other words, the first device may perform security authentication with an AP in step 404. Step 405 to step 408 may correspond to the device authorization protocol, in other words, in step 405 to step 408, a second device may establish, via the first device, a password shared with the AP. Step 409 may correspond to the device authentication protocol, in other words, the second device may perform security authentication with the AP in step 409.

The following describes step 401 to step 409 in detail.

401: The first device sends a first password ω to the AP, where the first password ω is a password preset before delivery.

In an example, the first password ω may be a factory-delivery password ω that is securely stored by the AP at delivery. The password ω may be transmitted together with the AP to a host owning the AP. For example, the password ω may be written into a secret envelope, or may be set in a QR (quick response) code attached to the AP, or may be sent to the host via a short message. This is not limited in this application. After obtaining the password ω, the host can input the password ω into the first device, so that the first device obtains the password ω. Then, the first device may send the first password ω to the AP.

Correspondingly, the AP receives the first password ω. After receiving the first password ω, the AP may check the first password ω. When checking the first password ω succeeds, the AP may set the first device as a master device (namely, a master supplicant device).

It should be noted that, in embodiments of this application, the AP needs to distinguish between supplicant devices (or user equipment). For example, the supplicant devices (or user equipment) are classified into a master device and a common device. The master device may be configured to manage the common device. For example, the master device may be responsible for authorization, in other words, the master device may authorize the common device, so that the common device can obtain a password shared with the AP.

For example, the master device may be, by default, the first device that is successfully connected to the AP. For example, when a family purchases a new AP and starts to use the AP for the first time, the $1^{st}$ device connected to the AP is the master device.

In some optional embodiments, the first device may further send an identifier (which may be denoted as $id_{mst}$) of the first device to the AP. Correspondingly, the AP receives the identifier $id_{mst}$ of the first device. The identifier $id_{mst}$ of the first device is a unique identity of the first device, and may be used to uniquely identify the first device.

In a possible implementation, the first device may generate the identifier $id_{mst}$ of the first device, include the identifier $id_{mst}$ of the first device in a data frame including the first password ω, and send the data frame to the AP. In an example, the identifier $id_{mst}$ of the first device may be, for example, a user name of the first device.

In another possible implementation, the identifier of the first device may be a MAC address of the first device. In this case, in step 401, the data frame that includes the first password ω and that is sent by the first device to the AP may include the MAC address of the first device. Alternatively, the first device may separately send the MAC address of the first device to the AP. This is not limited in this application.

402: The first device obtains a second password $pw_{mst}$ shared between the AP and the first device. The second password $pw_{mst}$ is a shared key between the first device and the AP.

403: The AP obtains the second password $pw_{mst}$ shared between the AP and the first device. The second password $pw_{mst}$ is the shared key between the first device and the AP.

In a possible implementation, the AP may require the first device to generate the second password $pw_{mst}$. For example, when checking the first password ω succeeds, the AP may send an indication message to the first device, to indicate the first device to generate the second password $pw_{mst}$. After receiving the indication message, the first device may generate the second password $pw_{mst}$. Then, the first device may send the second password $pw_{mst}$ to the AP. In this way, both the first device and the AP obtain the second password $pw_{mst}$.

In another possible implementation, the AP may generate the second password $pw_{mst}$, and transmit the second password $pw_{mst}$ to the first device. For example, when checking the first password ω succeeds, the AP may generate the second password $pw_{mst}$ for the first device, and send the second password $pw_{mst}$ to the first device. In this way, both the first device and the AP can obtain the second password.

In some optional embodiments, the AP may store the identifier (which may be denoted as $id_{mst}$) of the first device and the second password $pw_{mst}$, where there is a correspondence between the identifier $id_{mst}$ of the first device and the second password $pw_{mst}$. Therefore, in embodiments of this application, the correspondence between the identifier $id_{mst}$ of the first device and the second password $pw_{mst}$ is set, so that the second password $pw_{mst}$ can be bound to the identifier of the first device, to help enhance a rainbow table attack resistance capability on an AP side.

In addition, when a connection request of the first device is subsequently received, the second password $pw_{mst}$ may be obtained, and the device authentication protocol is performed with the first device based on the second password $pw_{mst}$.

In a possible implementation, the AP may generate the identifier $id_{mst}$ of the first device. Optionally, the AP may further send the generated identifier $id_{mst}$ of the first device to the first device.

In another possible implementation, the AP may receive the identifier $id_{mst}$ of the first device from the first device. For details, refer to the related descriptions in step 401. Details are not described again.

Therefore, in embodiments of this application, because checking the first password sent by the first device to the AP succeeds, the first device may serve as the master device to manage another device (which may be referred to as the common device), for example, authorize access by the common device to a network of the AP, or cancel access by the common device to a network of the AP.

In some optional embodiments, the AP may further determine that the first password w is invalid. For example, when checking the first password w succeeds and the AP sets the first device as the master device, the AP may determine that the first password w is invalid. After the AP determines that the first password w is invalid, when another device sends the first password w to the AP, checking the first password w does not succeed. Therefore, the AP does not determine the other device as a master device. In this way, only a limited quantity of master devices, for example, one or two master devices, may exist in a system, to help improve system security.

In some optional embodiments, the AP may further delete the stored identifier $id_{mst}$ of the first device and the second password $pw_{mst}$ corresponding to the identifier $id_{mst}$ of the first device, to revoke the first device as the master device. In this case, the AP may further activate the first password w. In an example, the identifier $id_{mst}$ of the first device and the second password $pw_{mst}$ can be deleted and the first password w can be activated by resetting a system of the AP. This is not limited in this application.

After the first password w is activated; and when another device subsequently sends the first password w to the AP, checking the first password w succeeds. In this case, the AP may further determine the other device as a master device, to change the master device.

404: The first device performs a 4-way handshake with the AP.

In an example, the first device and the AP may obtain a PMK based on the second password $pw_{mst}$, perform a 4-way handshake protocol to perform security authentication, and generate a session key and a group transient key, to protect subsequent unicast communication between the supplicant device and the AP and broadcast communication of the AP. Then, the first device may be securely connected to the AP, that is, establish a secure communication channel with the AP. Herein, for the 4-way handshake between the first device and the AP, refer to the descriptions in FIG. 1. Details are not described again.

After the first device is securely connected to the AP through the device authentication protocol, the first device may authorize the common device, so that the common device can obtain a password shared with the AP. Specifically, the first device, the second device, and the AP may perform the following step 405 to step 408, that is, the device authorization protocol, so that the second device can establish, via the first device, the password shared with the AP.

405: The second device sends a request #1 to the first device. Correspondingly, the first device receives the request #1.

Herein, the second device may serve as the common device and send the request #1 to the first device, where the request #1 is used to request the first device to allow the second device to access the AP. In other words, the second device may request authorization from the first device in step 405. In some embodiments, the request #1 may also be referred to as an authorization request. This is not limited in this application.

In some optional embodiments, the second device may further send an identifier (which may be denoted as $id_T$) of the second device to the first device. The identifier $id_T$ of the second device is a unique identity of the second device, and may be used to uniquely identify the second device.

In a possible implementation, the second device may generate the identifier (which may be denoted as $id_T$) of the second device, include the identifier $id_T$ of the second device in the request #1, and send the request #1 to the first device. In an example, $id_T$ may be, for example, a user name of the second device.

In another possible implementation, the identifier $id_T$ of the second device may be a MAC address of the second device. In this case, in step 405, a data frame that is sent by the second device to the first device and that includes the request #1 may include the MAC address of the second device. Alternatively, the second device may separately send the MAC address of the second device to the first device. This is not limited in this application.

406: The first device sends a request #2 to the AP, where the request #2 is used to request the second device to access the AP. Correspondingly, the AP receives the request #2. In some embodiments, the request #2 may also be referred to as an authorization request. This is not limited in this application.

For example, after receiving the request #1 from the second device, the first device may send the request #2 to the AP when determining to authorize the second device to connect to the AP.

In some other optional embodiments, when the first device determines not to authorize the second device, that is, does not allow the second device to connect to the AP, the first device may not send, to the AP, the request used to request the second device to access the AP.

In some optional embodiments, when determining to authorize the second device to connect to the AP, the first device may further determine an authorization policy. In an example, the authorization policy may indicate a validity period of the password shared between the AP and the second device, or whether the password shared between the AP and the second device is bound to the MAC address of the second device, or the like. This is not limited in this application. In this case, the request #2 may include the authorization policy.

In some optional embodiments, the request #2 may further include the identifier $id_T$ of the second device. Herein, the identifier $id_T$ of the second device may be the user name of the second device or the MAC address of the second device. This is not limited.

Optionally, when $id_T$ of the second device in the request #2 is not the MAC address of the second device, the request #2 may further include the MAC address of the second device.

For example, the first device may generate the identifier $id_T$ of the second device, or the first device obtains the identifier $id_T$ of the second device from the request #1 in step 405. This is not limited in this application.

407: The AP sends a third password to the first device, where the third password is the shared key between the second device and the AP. Correspondingly, the first device receives the third password.

For example, after receiving the request #2, the AP may generate the third password (which may be denoted as $pw_T$) of the second device, and send the third password $pw_T$ to the first device.

In some optional embodiments, when the request #2 includes the authorization policy, the AP may generate the third password $pw_T$ according to the authorization policy. For example, a validity period of the third password $pw_T$, or whether the third password $pw_T$ is bound to the MAC address of the second device may be set. This is not limited.

In some optional embodiments, the AP may store the identifier (which may be denoted as $id_T$) of the second device and the third password $pw_T$, where there is a correspondence between the identifier $id_T$ of the second device and the third password $pw_T$. Therefore, in embodiments of this application, the correspondence between the identifier $id_T$ of the second device and the third password $pw_T$ is set, so that the third password $pw_T$ can be bound to the identifier of the second device, to help enhance the rainbow table attack resistance capability on the AP end.

In addition, when a connection request of the second device is subsequently received, the third password $pw_T$ may be obtained, and security authentication may be performed with the second device based on the third password $pw_T$.

In a possible implementation, the AP may generate the identifier $id_T$ of the second device. Optionally, the AP may further send the generated identifier $id_T$ of the second device to the first device. In an example, the AP may transmit ($id_T$, $pw_T$) to the first device.

In another possible implementation, the AP may receive the identifier $id_T$ of the second device from the first device. For details, refer to the related descriptions in step 406. Details are not described again.

408: The first device sends the third password to the second device. Correspondingly, the second device receives the third password.

In some optional embodiments, when the AP generates the identifier of the second device and transmits ($id_T$, $pw_T$) to the first device, the first device may transmit ($id_T$, $pw_T$) to the second device.

In some optional embodiments, when the first device generates the identifier $id_T$ of the second device, and receives the third password $pw_T$ from the AP, the first device may transmit ($id_T$, $pw_T$) to the second device. This is not limited in this application.

Therefore, in embodiments of this application, the first device may request the AP to connect the second device to the AP, and receive and send, to the second device, the third password that is generated by the AP and that is shared between the AP and the second device, so that the first device authorizes the second device, and the second device can obtain the third password shared with the AP. Therefore, in embodiments of this application, through the device authorization protocol, the common device and the AP may share a password corresponding to the common device, to help prevent a password from being shared by a plurality of devices, and to help the master device to manage the common device.

Optionally, 409: The second device performs a 4-way handshake with the AP.

In an example, the second device and the AP may obtain a PMK based on the third password $pw_T$, perform a 4-way handshake protocol to perform security authentication and calculate a PTK, and generate a session key and a group transient key, to protect subsequent unicast communication between the supplicant device and the AP and broadcast communication of the AP. Then, the second device may be securely connected to the AP, that is, establish a secure communication channel with the AP. Herein, for the 4-way handshake between the second device and the AP, refer to the descriptions in FIG. 1. Details are not described again.

Therefore, in embodiments of this application, when checking by the AP on the first password that is preset before delivery and that is input by the first device succeeds, the AP and the first device may perform a security authentication protocol based on the second password shared between the AP and the first device. Further, the first device may request the AP to connect the second device to the AP, and the AP sends, in response to the request, the third password shared by the AP and the second device to the first device, so that the second device can obtain, via the first device, the third password shared between the second device and the AP. Therefore, in embodiments of this application, the first device and the AP may share the second password, and the second device and the AP may share the third password, to help prevent a password from being shared among a plurality of devices and reduce the risk of a compromised password. In addition, the second device may obtain, via the first device, the third password shared by the second device and the AP, so that in this application, the first device may manage access by the second device to the AP.

In some embodiments, in a process in which the supplicant device (for example, the first device or the second device) and the AP perform security authentication, the AP may further negotiate a PMK with the supplicant device based on a password (for example, the second password or the third password) and according to a simultaneous authentication of equals (SAE) protocol. This is not limited in this application. When the SAE process is used, although the possibility that brute force cracking will be performed on a password can be reduced or even avoided, an attacker may launch a side channel attack on the AP or the supplicant device. In this case, the attacker may still obtain the password shared between the supplicant device and the AP, causing the password to be compromised.

In some other embodiments, in a process in which the supplicant device (for example, the first device or the second device) performs security authentication with the AP, the AP may further negotiate a pairwise master key PMK with the supplicant device based on the password (for example, the second password or the third password) and according to a twin base password encrypted key exchange (TBPEKE) protocol, and then perform the 4-way handshake with the supplicant device based on the PMK.

Therefore, in embodiments of this application, a PMK with a high entropy value may be generated by performing a TBPEKE process. Therefore, embodiments of this application can help provide an offline dictionary attack resistance capability for the AP and the first device when the AP and the first device perform security authentication. In addition, because the side channel attack can be easily resisted through TBPEKE, in embodiments of this application, the PMK is generated by performing TBPEKE, so that side channel attack resistance capabilities of the AP and the supplicant device in a Wi-Fi security authentication process can be improved.

TBPEKE is also a PAKE protocol. FIG. 5 shows an example of a TBPEKE process. As shown in FIG. 5, public parameters of two communication parties A and B in the TBPEKE include: a cyclic group G (Gofprimeorderp) whose order is a prime number p, two independent random generators U and V (which are represented as U and $$V \xleftarrow{R} G \Big)$$

in the group, and a hash function H for outputting $\{0,1\}^l$ (ahashfunctiononto$\{0,1\}^l$, which is represented as H:$\{0,1\}^* \rightarrow \{0,1\}^l$). H: $\{0,1\}^* \rightarrow \{0,1\}$ is a secure hash function, for example, may be SHA256.

In the TBPEKE, A and B share a password pw. A may calculate the following based on the public parameters and the password pw:

$$g \leftarrow U \cdot V^{pw}, x \xleftarrow{R} Z_p^*, X \leftarrow g^x$$

Then, A sends A$\|$X to B.

B may also calculate the following based on the public parameters and the password pw:

$$g \leftarrow U \cdot V^{pw}, y \xleftarrow{R} Z_p^*, Y \leftarrow g^y$$

Then, B sends Y to A.

After receiving Y, A may calculate: $Z \leftarrow Y^x$.

After receiving AIX B may calculate: $Z \leftarrow X^y$.

Then, A and B may respectively calculate a key sk based on A, B, g, X, Y, and Z. For example, the sk may be calculated through the following formula:

$$sk \leftarrow H(A\|B\|g\|X\|Y\|Z).$$

It should be noted that, when G represents an elliptic curve group, $g = U \cdot V^{pw}$ may be considered as a hash-to-curve function for converting the password pw into a point on an elliptic curve. In the hash-to-curve function, a point multiplication operation is performed on the pw. The point multiplication operation can effectively resist a side channel attack. Therefore, in embodiments of this application, the side channel attack can be avoided through the TBPEKE.

In some embodiments, in a process of performing device authentication, some modifications may be made to the TBPEKE process shown in FIG. 5 as required. For example, when B is used as an example of the AP, B may store $g = U \cdot V^{pw}$ instead of the pw. For another example, some variations may be further performed on $g = U \cdot V^{pw}$. These all fall within the protection scope of embodiments of this application.

The following describes several specific embodiments provided in this application with reference to FIG. 6 to FIG. 10. In embodiments of FIG. 6 to FIG. 10, a TBPEKE is used to generate a PMK.

Figure 6:
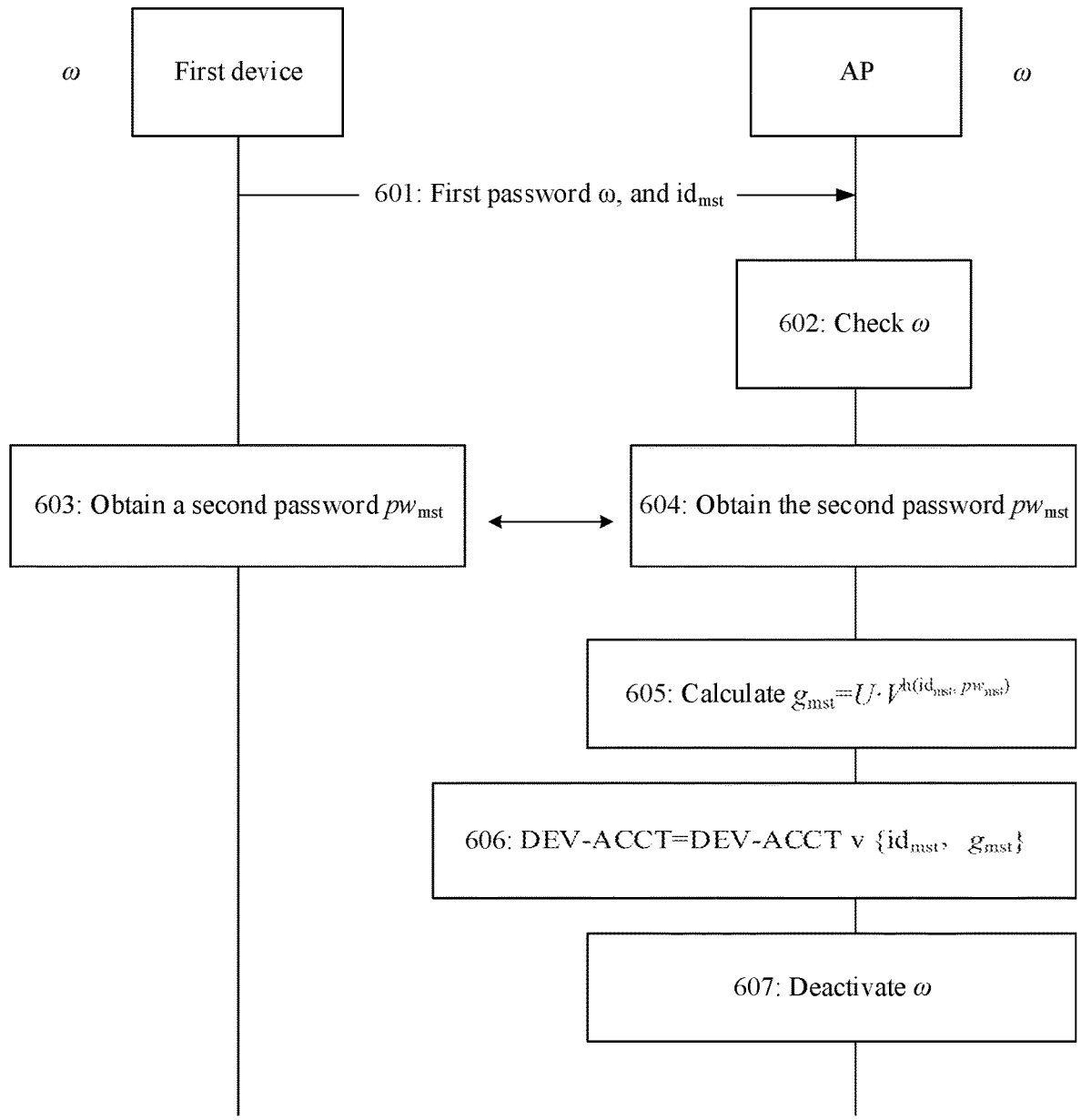
FIG. 6 is a specific example of a process corresponding to a master device determining protocol according to an embodiment of this application.

FIG. 6 shows a specific example of a process corresponding to a master device determining protocol. As shown in FIG. 6, the master device determining protocol may be performed by a first device and an AP, and may include step 601 to step 607.

It should be understood that, although steps or operations of the master device determining protocol process are shown in FIG. 6, the steps or operations are only examples, and other operations or variations of the operations in FIG. 6 may also be performed in this embodiment of this application. Furthermore, the steps in FIG. 6 may be performed in a sequence different from that presented in FIG. 6, and some operations in FIG. 6 may not need to be performed.

601: The first device sends a first password ω and an identifier $id_{mst}$ of the first device to the AP. Correspondingly, the AP receives the first password ω and the identifier $id_{mst}$ of the first device.

Specifically, for the first password ω and the identifier $id_{mst}$ of the first device, refer to the descriptions in FIG. 4. Details are not described herein again.

In some optional embodiments, in step 601, the first device may not send the identifier $id_{mst}$ of the first device to the AP. This is not limited in this application.

602: The AP checks ω.

For example, when checking ω succeeds, the AP may determine the first device as a master device. In this case, the following step 603 to step 607 may be performed. Specifically, for the master device, refer to the descriptions in FIG. 4. Details are not described herein again.

In some embodiments, when checking ω does not succeed, the AP does not determine the first device as the master device. Then, the process may end.

603: The first device obtains a second password $pw_{mst}$ (getpw$_{mst}$).

604: The AP obtains the second password $pw_{mst}$ (getpw$_{mst}$).

Specifically, for the second password $pw_{mst}$ and how the first device or the AP obtains the second password $pw_{mst}$, refer to the descriptions in FIG. 4. Details are not described herein again.

In some embodiments, after the first device and the AP separately obtain the second password $pw_{mst}$, the AP may store the identifier $id_{mst}$ of the first device and the second password $pw_{mst}$, and the first device and the AP may perform device authentication based on the identifier $id_{mst}$ of the first device and the second password $pw_{mst}$ and according to an SAE protocol. For details, refer to the descriptions in FIG. 4. Details are not described again.

In some other embodiments, the first device and the AP may negotiate a pairwise master key PMK based on the second password $pw_{mst}$ and according to a TBPEKE protocol, and then perform the 4-way handshake with the first device based on the PMK, to perform the security protocol. In this case, the AP may further perform the following step 605 and step 606.

Optionally, 605: Calculate $g_{mst} = U \cdot V^{h(id_{mst}, pw_{mst})}$.

U and V are two independent random generators obtained from a cyclic group G whose order is a prime number p, and may be stored as system parameters on an AP end, h( ) is a secure hash function, and $g_{mst}$ is a hash-to-curve function of the first device, which may be referred to as a first hash-to-curve function $g_{mst}$, and is used to convert a password $pw_{mst}$ into a point on an elliptic curve through a point multiplication operation. The $g_{mst}$ may generate a related parameter when the first device and the AP subsequently perform identity authentication. For details, refer to the following descriptions.

Herein, the hash-to-curve function $g_{mst}$ is obtained based on the identifier $id_{mst}$ of the first device and the second password $pw_{mst}$. In this way, the hash-to-curve function $g_{mst}$ can be bound to the identifier $id_{mst}$ of the first device, to enhance the rainbow table attack resistance capability on the AP side.

Optionally, 606: DEV-ACCT=DEV-ACCT$_\cup${$id_{mist}$, $g_{mst}$}.

DEV-ACCT represents an account file stored on an AP side, and may include identifiers of one or more accounts and a hash-to-curve function corresponding to each account. In step 606, the AP may store the identifier $id_{mst}$ of the first device and the hash-to-curve function $g_{mst}$ obtained through calculation in the account file DEV-ACCT, that is, may add {$id_{mst}$, $g_{mst}$} to DEV-ACCT, that is, DEV-ACCT=DEV-ACCT$_\cup$ {$id_{mst}$, $g_{mst}$}. That is, {$id_{mst}$, $g_{mst}$} may be an account established by the AP for the first device.

It should be noted that an example in which the identifier $id_{mst}$ of the first device and the corresponding hash-to-curve function $g_{mst}$ are stored in the account file DEV-ACCT is used for description herein. However, this embodiment of this application is not limited thereto. For example, the account file in which the identifier $id_{mst}$ of the first device and the corresponding hash-to-curve function $g_{mst}$ are stored may have another name, or the identifier $id_{mst}$ of the first device and the corresponding hash-to-curve function g may be stored in another file, which is not limited.

607: Deactivate ω.

Specifically, for step 607, refer to the descriptions in FIG. 4. Details are not described herein again.

In some embodiments, the AP may further change the master device. For example, the AP may delete the stored identifier $id_{mst}$ of the first device and the hash-to-curve function $g_{mst}$ corresponding to the identifier $id_{mst}$ of the first device, to revoke the first device as the master device. In this case, the AP may further activate the first password ω. In an example, the identifier $id_{mst}$ of the first device and the hash-to-curve function $g_{mst}$ can be deleted and the first password ω can be activated by resetting a system of the AP. This is not limited in this application.

After the first password ω is activated, and when another device sends the first password ω to the AP, checking the first password ω succeeds. In this case, the AP may further determine the other device as a master device, to change the master device.

Therefore, in embodiments of this application, in the master device determining protocol process, the AP may further calculate the hash-to-curve function $g_{mst}$ based on the second password $pw_{mst}$, and store the identifier $id_{mst}$ of the first device and the hash-to-curve function $g_{mst}$, so that the first device and the AP can subsequently perform security authentication by using the hash-to-curve function $g_{mst}$.

In some other embodiments, alternatively, step 605 may be: generating a random number $n_{mst}$, and calculating $g_{mst}=U \cdot V^{h(n_{mst},pw_{mst})}$. Correspondingly, step 606 may be replaced with: DEV-ACCT=DEV-ACCT$\cup\{id_{mst}, n_{mst}, g_{mst}\}$. In addition, the AP may send the random number $n_{mst}$ to the first device.

In other words, in embodiments of this application, the random number $n_{mst}$ may be used to replace the identifier $id_{mst}$ of the first device to calculate $g_{mst}$. In this way, the rainbow table attack resistance capability on the AP side can be enhanced.

Figure 7:
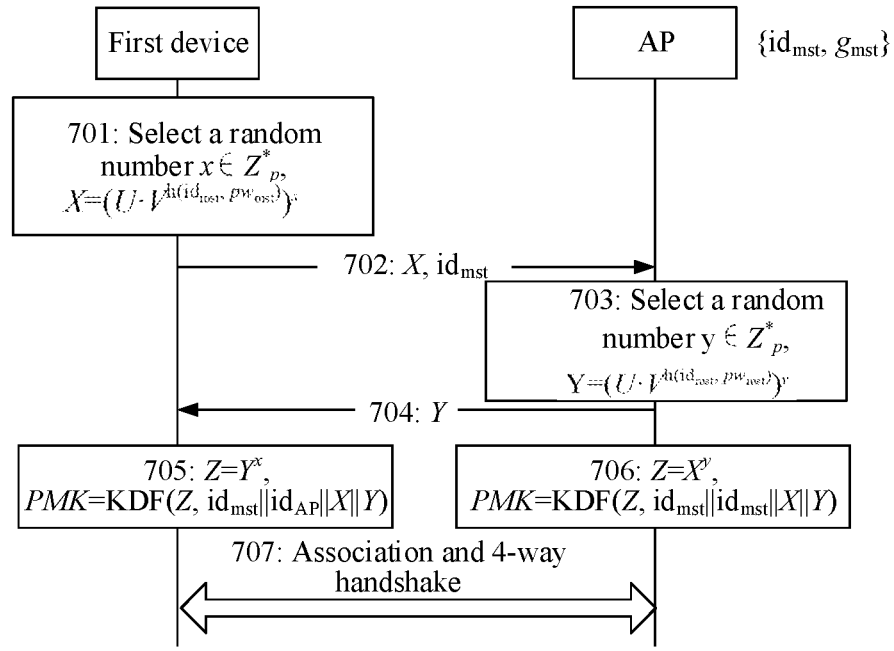
FIG. 7 is a specific example of a process corresponding to a device authentication protocol according to an embodiment of this application.

FIG. 7 shows a specific example of a process corresponding to a device authentication protocol. The first device may perform security authentication with the AP. For example, the first device obtains a PMK based on the hash-to-curve function $g_{mst}$, and performs a 4-way handshake protocol to perform security authentication. For example, the device authentication protocol process may be performed after the master device determining protocol process shown in FIG. 6. That is, after the AP determines the first device as the master device, the first device may perform security authentication with the AP based on the obtained second password. In addition, the device authentication protocol shown in FIG. 7 may be a specific example of step 404 in FIG. 4. This is not limited in this application.

In an example, after the master device determining protocol, the first device may store the second password $pw_{mst}$, and the AP end stores the identifier $id_{mst}$ of the first device and the hash-to-curve function $g_{mst}$, that is, stores $\{id_{mst}, g_{mst}\}$, where $g_{mst}=U \cdot V^{h(id_{mst},pw_{mst})}$. This is not limited in this application.

In some other embodiments, when the AP side calculates $g_{mst}=U \cdot V^{h(n_{mst},pw_{mst})}$, the AP end stores the identifier $id_{mst}$ of the first device, the random number $n_{mst}$, and the hash-to-curve function $g_{mst}$, that is, stores $\{id_{mst}, n_{mst}, g_{mst}\}$. This is not limited in this application.

It should be understood that, although steps or operations of the device authentication protocol process are shown in FIG. 7, the steps or operations are only examples, and other operations or variations of the operations in FIG. 7 may also be performed in this embodiment of this application. Furthermore, the steps in FIG. 7 may be performed in a sequence different from that presented in FIG. 7, and all operations in FIG. 7 may not need to be performed.

As shown in FIG. 7, the device authentication process may include step 701 to step 707.

701: A first device selects $x \in Z^*_p$, and determines $X=(U \cdot V^{h(id_{mst},pw_{mst})})^x$.

In an example, the first device selects the random number $x \in Z^*_p$, and determines $X=(g_{mst})^x=(U \cdot V^{h(id_{mst},pw_{mst})})^x$. Specifically, U and V are two independent random generators obtained from a cyclic group G whose order is a prime number p, and may be stored on a first device side as system parameters. The first device may determine a hash-to-curve function $g_{mst}=U \cdot V^{h(id_{mst},pw_{mst})}$ based on the system parameters U and V and a password $pw_{mst}$. Then, the first device may select the random number $x \in Z^*_p$, and determine a first parameter $X=(U \cdot V^{h(id_{mst},pw_{mst})})^x$ based on the hash-to-curve function $g_{mst}$ and the random number x.

It should be noted that in step 701, $g_{mst}$ determined by the first device side is the same as $g_{mst}$ stored on the AP side. For example, $g_{mst}$ may be implemented by presetting code in the first device and the AP. This is not limited in this application.

702: The first device sends X and $id_{mst}$ to an AP. Correspondingly, the AP receives X and $id_{mst}$.

For example, the first device may send a connection request to the AP, where the connection request includes the parameter X and the identifier $id_{mst}$ of the first device. This is not limited in this application.

703: The AP selects a random number $y \in Z^*_p$, and determines $Y=(U \cdot V^{h(id_{mst},pw_{mst})})^y$.

Herein, when the AP end may store $g_{mst}=U \cdot V^{h(id_{mst},pw_{mst})}$ instead of the password $pw_{mst}$, the AP end may select the random number y after receiving the parameter X and $id_{mst}$, and determine the second parameter $Y=U \cdot V^{h(id_{mst},pw_{mst})y}$ based on a pre-stored hash-to-curve function $g_{mst}=U \cdot V^{h(id_{mst},pw_{mst})}$ and the random number y.

Therefore, in embodiments of this application, the AP end directly stores $g_{mst}=U \cdot V^{h(id_{mst},pw_{mst})}$ instead of the password $pw_{mst}$, so that the AP can be prevented from calculating $g_{mst}$ in real time when performing device authentication, to reduce a calculation amount of the AP end, thereby helping reduce or avoid a denial of service (DoS) attack.

In some other embodiments, the AP end may store the identifier $id_{mst}$ of the first device and the second password $pw_{mst}$. In this case, after the AP end receives the parameter X and $id_{mst}$, the AP may determine the hash-to-curve function $g_{mst}=U \cdot V^{h(id_{mst},pw_{mst})}$ based on the stored system parameters U and V and the password $pw_{mst}$, further select the random number y, and determine the second parameter Y based on $Y=g^y$. This is not limited in this application.

704: The AP sends Y to the first device. Correspondingly, the first device receives Y.

705: The first device calculates $Z=Y^x$, and PMK=KDF(Z, $id_{mst}$‖$id_{AP}$‖X‖Y).

706: The AP calculates $Z=Z^y$, and PMK=KDF(Z, $id_{mst}$‖$id_{AP}$‖X‖Y).

For example, the first device and the AP may separately determine a pairwise master key PMK based on the parameter X, the parameter Y, the identifier $id_{mst}$ of the first device, and an identifier $id_{AP}$ of the AP.

In an example, the first device and the AP may separately calculate a Z value, and determine the PMK based on PMK=KDF(Z, $id_{mst}$‖$id_{AP}$‖X‖Y). For the first device, $Z=Y^x$, and for the AP, $Z=X^y$. $id_{AP}$ represents the identifier of the AP. For example, the identifier of the AP may be a MAC address of the AP. KDF( ) is a standard key derivation function.

In some optional embodiments, in step 705, that is, before the first device determines the PMK, the AP may send a broadcast message, where the broadcast message includes the MAC address of the AP. Correspondingly, the supplicant device may receive the broadcast message, and obtain the MAC address of the AP via the broadcast message. In an example, the broadcast message may be a beacon frame, and the beacon frame may be sent before step 701. This is not limited in this application.

707: The first device performs an association and the 4-way handshake with the AP.

Herein, through the association and in the 4-way handshake process, the AP and the first device may perform mutual identity authentication and calculate a PTK. After the first device passes the device authentication protocol, the first device may be connected to the AP and establish a secure communication channel.

Therefore, in embodiments of this application, the first device may determine the parameter X based on the hash-to-curve function $g_{mst}$, and send the parameter X and the identifier $id_{mst}$ of the first device to the AP. The AP may send the parameter Y to the first device. The parameter Y is also determined based on the hash-to-curve function $g_{mst}$. Therefore, both the first device and the AP can determine the PMK based on the parameter X, the parameter Y, the identifier $id_{mst}$ of the first device, and the identifier $id_{AP}$ of the AP.

In embodiments of this application, the first parameter X and the second parameter Y that are transmitted between the AP and the first device are generated based on a hash-to-curve function g and a random number, and do not involve password calculation. Therefore, it is difficult for an attacker to know a password, so that side channel attack resistance capabilities of the AP and the first device in a Wi-Fi security authentication process can be improved, and the AP and the first device can avoid a side channel attack during security authentication.

However, in the conventional technology, when an SAE process is used to calculate a PMK in a WPA3 protocol, a shared password needs to be used for calculation. In this way, through channel testing and brute force cracking, an attacker can obtain a password, compromising the password.

In some other embodiments, alternatively, when the AP side stores $g_{mst}=U \cdot V^{h(n_{mst},pw_{mst})}$, step 701 may be that the first device determines $X=(U \cdot V^{h(n_{mst},pw_{mst})})^x$. Step 703 may be replaced with $Y=(U \cdot V^{h(n_{mst},pw_{mst})})^y$. This is not limited in this application. In addition, before step 701, the first device may receive a random number $n_{mst}$ from the AP. In this way, the rainbow table attack resistance capability on the AP side can be enhanced.

Figure 8:
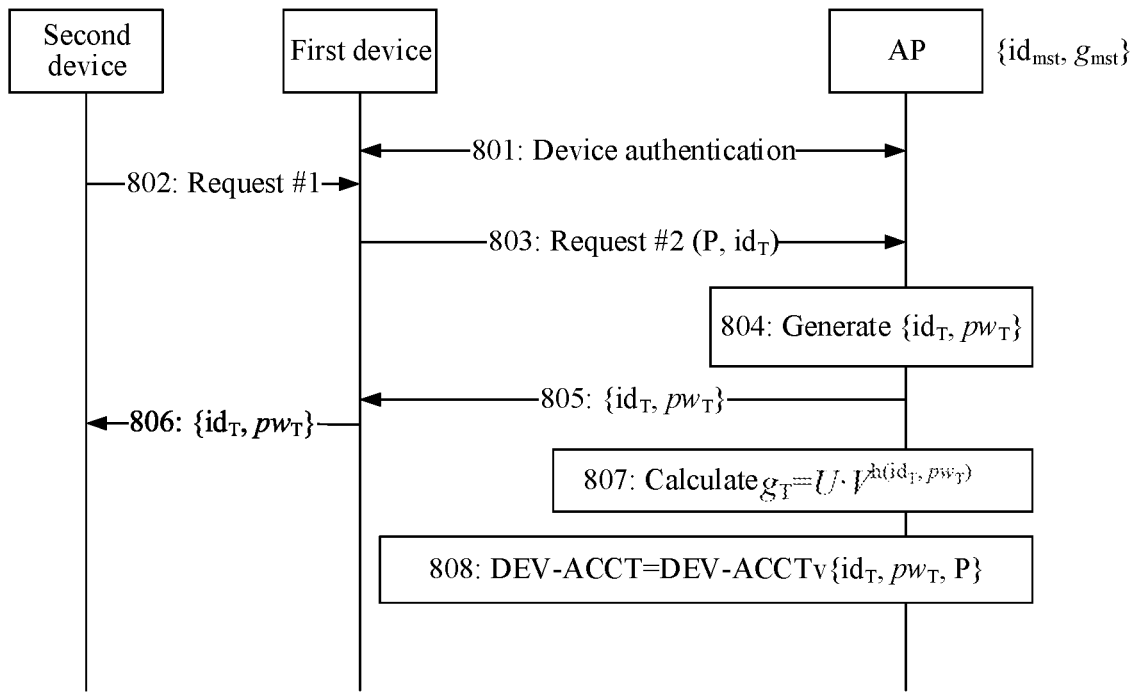
FIG. 8 is a specific example of a process corresponding to a device authorization protocol according to an embodiment of this application.

FIG. 8 shows a specific example of a process corresponding to a device authorization protocol. The first device may authorize the second device, so that the second device can obtain a third password shared with the AP. The device authorization protocol process may be performed after the master device passes the device authentication protocol, for example, after the device authentication protocol process shown in FIG. 7. In an example, after the master device determining protocol, the AP end may store the identifier $id_{mst}$ of the first device and the hash-to-curve function $g_{mst}$, that is, store $\{id_{mst}, g_{mst}\}$. This is not limited in this application.

In some other embodiments, when the AP side calculates $g_{mst}=U \cdot V^{h(n_{mst},pw_{mst})}$, the AP end stores the identifier $id_{mst}$ of the first device, the random number $n_{mst}$, and the hash-to-curve function $g_{mst}$, that is, stores $\{id_{mst}, n_{mst}, g_{mst}\}$. This is not limited in this application.

It should be understood that, although steps or operations of the device authorization protocol process are shown in FIG. 8, the steps or operations are only examples, and other operations or variations of the operations in FIG. 8 may also be performed in this embodiment of this application. Furthermore, the steps in FIG. 8 may be performed in a sequence different from that presented in FIG. 8, and all operations in FIG. 8 may not need to be performed.

As shown in FIG. 8, the device authentication process may include step 801 to step 808.

801: The first device performs device authentication with the AP.

For example, for step 801, refer to the descriptions in FIG. 7. Details are not described herein again.

802: The second device sends a request #1 to the first device, where the request #1 is used to request the first device to allow the second device to access the AP. Correspondingly, the first device receives the request #1.

For example, for step 802, refer to the descriptions in step 405 in FIG. 4. Details are not described herein again.

803: The first device sends a request #2 to the AP. The request #2 is used to request the second device to access the AP. Optionally, the request #2 may include an authorization policy P and an identifier $id_T$ of the second device.

For example, for step 803, refer to the descriptions in step 406 in FIG. 4. Details are not described herein again.

804: The AP generates $\{id_T, pw_T\}$.

For example, the AP generates a third password $pw_T$ of the second device. The AP generates $\{id_T, pw_T\}$ based on the identifier $id_T$ of the second device and the third password $pw_T$. For example, the AP may obtain the identifier $id_T$ of the second device from the request #2. In some other embodiments, when the request #2 does not include the identifier $id_T$ of the second device, the AP may generate the identifier $id_T$ of a second device. This is not limited in this application. For details, refer to the descriptions in step 407 in FIG. 4. Details are not described again.

Optionally, when the request #2 includes the authorization policy P, the AP may generate the third password according to the authorization policy P. For example, refer to the descriptions in step 407 in FIG. 4. Details are not described again.

805: The AP sends $\{id_T, pw_T\}$ to the first device. Correspondingly, the first device receives $\{id_T, pw_T\}$.

806: The first device sends $\{id_T, pw_T\}$ to the second device. Correspondingly, the second device receives $\{id_T, pw_T\}$.

In some embodiments, after the second device and the AP separately obtain the third password $\{id_T, pw_T\}$, the AP may store $\{id_T, pw_T\}$, and the second device and the AP may perform device authentication based on the identifier $id_T$ of the second device and the third password $pw_T$. For details, refer to the descriptions in FIG. 4. Details are not described again.

In some other embodiments, when the hash-to-curve function used by the second device and the AP to generate the PMK may be used to convert the password pw into a point on an elliptic curve through a point multiplication operation, for example, when a TBPEKE may be used to generate the PMK, the AP may further perform the following step 807 and step 808.

Optionally, 807: The AP calculates $g_T=U \cdot V^{h(id_T,pw_T)}$.

U and V are two independent random generators obtained from a cyclic group G whose order is a prime number p, and may be stored on an AP side as system parameters, h( ) is a secure hash function, and $g_T$ is a hash-to-curve function of the second device, which may be referred to as a second hash-to-curve function $g_T$, and is used to convert the password $pw_T$ into a point on an elliptic curve through a point multiplication operation. $g_T$ may generate a related parameter when the second device and the AP subsequently perform identity authentication. For details, refer to the following descriptions.

Herein, the hash-to-curve function $g_T$ is obtained based on the identifier $id_T$ of the second device and the third password $pw_T$. In this way, the hash-to-curve function $g_T$ can be bound to the identifier $id_T$ of the second device, to enhance the rainbow table attack resistance capability on the AP end.

Optionally, 808: DEV-ACCT=DEV-ACCT$_V${id$_{mst}$, g$_{mst}$, P}.

For DEV-ACCT, refer to the descriptions in FIG. 6. Details are not described again. In step 608, the AP may store the identifier id$_T$ of the second device and the hash-to-curve function g$_T$ obtained through calculation in the account file DEV-ACCT. For example, {id$_T$, g$_T$, P} may be added to DEV-ACCT, that is, DEV-ACCT=DEV-ACCT$_V$ {id$_T$, g$_T$, P}. That is, {id$_T$, g$_T$, P} may be an account established by the AP for the second device.

In some other embodiments, when the request #2 does not include the authorization policy P, {id$_T$, g$_T$, P} may be added to DEV-ACCT, that is, DEV-ACCT=DEV-ACCT$_V${id$_T$, g$_T$, P}, as an account established by the AP for the second device. This is not limited in this application.

It should be noted that an example in which the identifier id$_T$ of the second device and the corresponding hash-to-curve function g$_T$ are stored in the account file DEV-ACCT is used for description herein. However, this embodiment of this application is not limited thereto. For example, the account file in which the identifier id$_T$ of the second device and the corresponding hash-to-curve function g$_T$ are stored may have another name, or the identifier id$_T$ of the second device and the corresponding hash-to-curve function g may be stored in another file.

Therefore, in embodiments of this application, in the device authorization protocol process, the AP may further calculate the hash-to-curve function g$_T$ based on the third password pw$_T$, and store the identifier id$_T$ of the second device and the hash-to-curve function g$_T$, so that the second device and the AP can subsequently perform security authentication by using the hash-to-curve function g$_T$.

In some embodiments, alternatively, step 804 may be: The AP generates {id$_T$, pw$_T$, n$_T$}. Correspondingly, in step 805 and step 806, {id$_T$, pw$_T$, n$_T$} is transmitted. Further, in step 807, the AP calculates g$_T$=U·V$^{h(n_T,pw_T)}$. Correspondingly, step 808 may be replaced with: DEV-ACCT=DEV-ACCT$_V${id$_T$, n$_T$, g$_T$, P}, or DEV-ACCT=DEV-ACCT$_V${id$_T$, n$_T$, g$_T$}. In addition, the AP may send the random number n$_T$ to the first device, and then the first device sends the random number n$_T$ and id$_T$ to the second device. For example, the AP may send n$_T$ and g$_T$ together to the first device, and then the first device sends n$_T$, id$_T$, and g$_T$ together to the second device.

In other words, in embodiments of this application, the random number n$_T$ may be used to replace the identifier id$_T$ of the second device to calculate g$_T$. In this way, the rainbow table attack resistance capability on the AP side can be enhanced.

Figure 9:
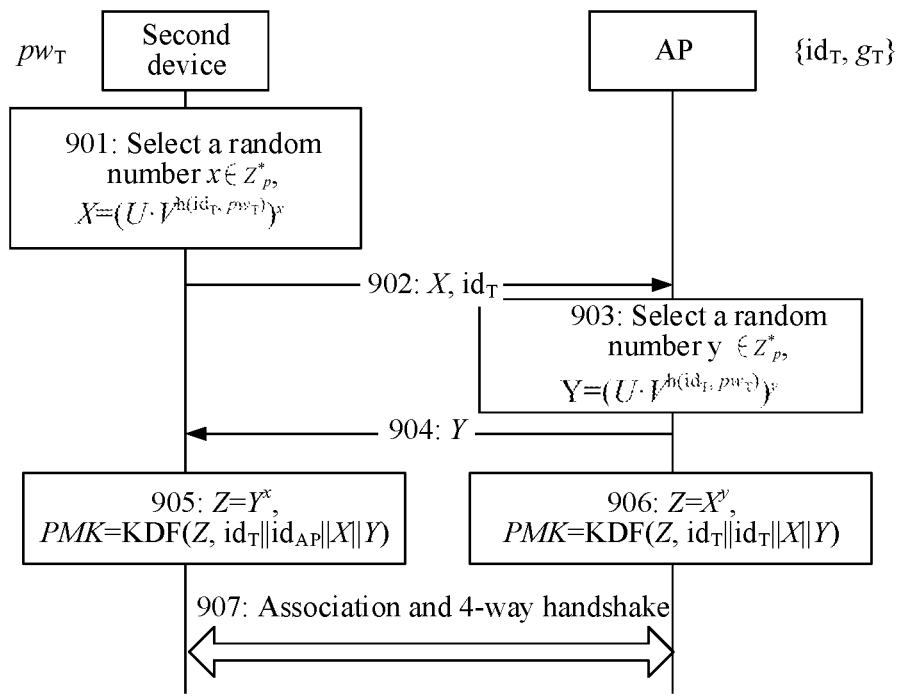
FIG. 9 is another specific example of a process corresponding to a device authentication protocol according to an embodiment of this application.

FIG. 9 shows another specific example of a process corresponding to a device authentication protocol. The second device may perform device authentication with the AP. For example, the second device obtains a PMK based on the hash-to-curve function g$_T$, and performs a 4-way handshake protocol to perform security authentication. For example, the device authentication protocol process may be performed after the device authorization protocol process shown in FIG. 8, that is, after the first device authorizes the second device, so that after the second device obtains the third password shared with the AP, the second device can perform security authentication with the AP based on the obtained third password. In addition, the device authentication protocol shown in FIG. 9 may be a specific example of step 409 in FIG. 4. This is not limited in this application.

In an example, after the device authorization protocol, the second device may store the third password pw$_T$, and the AP end stores the identifier id$_T$ of the second device and the hash-to-curve function g$_T$, that is, stores {id$_T$, g$_T$}. This is not limited in this application.

In some other embodiments, when the AP side calculates g$_T$=U·V$^{h(n_T,pw_T)}$, the AP side stores the identifier id$_T$ of the second device, the random number n$_T$, and the hash-to-curve function g$_T$, that is, stores {id$_T$, n$_T$, g$_T$}. This is not limited in this application.

It should be understood that, although steps or operations of the device authentication protocol process are shown in FIG. 9, the steps or operations are only examples, and other operations or variations of the operations in FIG. 9 may also be performed in this embodiment of this application. Furthermore, the steps in FIG. 9 may be performed in a sequence different from that presented in FIG. 9, and all operations in FIG. 9 may not need to be performed.

As shown in FIG. 9, the device authentication process may include step 901 to step 907.

901: The second device selects x∈Z*$_p$, and determines X==U·V$^{h(id_T,pw_T)x}$.

For example, a process in which the second device selects x∈Z*$_p$ and determines X==U·V$^{h(id_T,pw_T)x}$ is similar to the process in which the first device selects x∈Z*$_p$ and determines X==U·V$^{h(id_{mst},pw_{mst})x}$. For details, refer to the descriptions of step 701 in FIG. 7. Some simple adaptations may be performed, and details are not described herein again.

902: The second device sends X and id$_T$ to the AP. Correspondingly, the AP receives X and id$_T$.

For example, the second device may send a connection request to the AP, where the connection request includes the parameter X and the identifier id$_T$ of the second device. This is not limited in this application.

903: The AP selects a random number y∈Z*$_p$, and determines Y==U·V$^{h(id_T,pw_T)y}$.

For example, a process in which the AP selects y∈Z*$_p$ and determines Y=(U·V$^{h(id_T,pw_T)})^y$ is similar to the process in which the AP selects y∈Z*$_p$ and determines Y=(U·V$^{h(id_{mst},pw_{mst})})^y$. For details, refer to the descriptions of step 703 in FIG. 7. Some simple adaptations may be performed, and details are not described herein again.

904: The AP sends Y to the second device. Correspondingly, the second device receives Y.

905: The second device calculates Z=Y$^x$ and PMK=KDF (Z, id$_T$||id$_{AP}$||X||Y).

906: The AP calculates Z=X$^y$, and PMK=KDF (Z, id$_T$||id$_{AP}$||X||Y).

For example, a process in which the second device calculates Z and PMK=KDF (Z, id$_T$||id$_{AP}$||X||Y) is similar to the process in which the first device calculates Z and PMK=KDF (Z, id$_{mst}$||id$_{AP}$||X||Y), and a process in which the AP calculates Z and PMK=KDF(Z, id$_T$||id$_{AP}$||X||Y) is similar to a process in which the AP calculates Z and PMK=KDF(Z, id$_{mst}$||id$_{AP}$||X||Y). For details, refer to the descriptions of step 705 and step 706 in FIG. 7. Some simple adaptations may be performed, and details are not described herein again.

907: The second device performs an association and the 4-way handshake with the AP.

Herein, through the association and in the 4-way handshake process, the AP and the second device can perform mutual identity authentication and calculate a PTK. After the second device passes the device authentication protocol, the second device may be connected to the AP and establish a secure communication channel.

Therefore, in embodiments of this application, the second device may determine the parameter X based on the hash-to-curve function g$_T$, and send the parameter X and the identifier id$_T$ of the second device to the AP. The AP may send the parameter Y to the second device. The parameter Y is also determined based on the hash-to-curve function $g_T$. Therefore, both the second device and the AP can determine the PMK based on the parameter X, the parameter Y, the identifier $id_T$ of the second device, and the identifier $id_{AP}$ of the AP.

In embodiments of this application, the first parameter X and the second parameter Y that are transmitted between the AP and the second device are generated based on the hash-to-curve function $g_T$ and the random number, and do not involve password calculation. Therefore, it is difficult for an attacker to know a password, so that side channel attack resistance capabilities of the AP and the second device in a Wi-Fi security authentication process can be improved, and the AP and the second device can avoid a side channel attack during security authentication.

However, in the conventional technology, when an SAE process is used to calculate a PMK in a WPA3 protocol, a shared password needs to be used for calculation. In this way, through channel testing and brute force cracking, an attacker can obtain a password, causing the password to be compromised.

In some other embodiments, alternatively, when the AP side stores $g_T = U \cdot V^{h(n_T, pw_T)}$, step 901 may be that the first device determines $X = (U \cdot V^{h(n_T, pw_T)})^x$. Step 903 may be replaced with $Y = (U \cdot V^{h(n_T, pw_T)})^y$. This is not limited in this application. In addition, before step 901, the second device may obtain the random number $n_T$ sent by the AP. In this way, the rainbow table attack resistance capability on the AP side can be enhanced.

In the device identity authentication protocol, in a process in which a supplicant device (for example, the first device or the second device) generates a PMK with the AP based on a password pw (for example, the second password $pw_{mst}$ corresponding to the first device, or the third password $pw_T$ corresponding to the second device), the AP side is vulnerable to a DoS attack. To reduce or avoid the DoS attack, at least one of the following solutions may be used in embodiments of this application.

Solution 1: The AP may send an anti-DoS credential token to a supplicant device, and check a token sent by the supplicant device again. The AP further processes a connection request of the supplicant device only when checking the token succeeds.

Solution 2: The AP may maintain a list of devices in processing (DEVinPROC), and the AP further processes a connection request of the supplicant device only when the supplicant device is not in the list of devices in processing.

Figure 10:
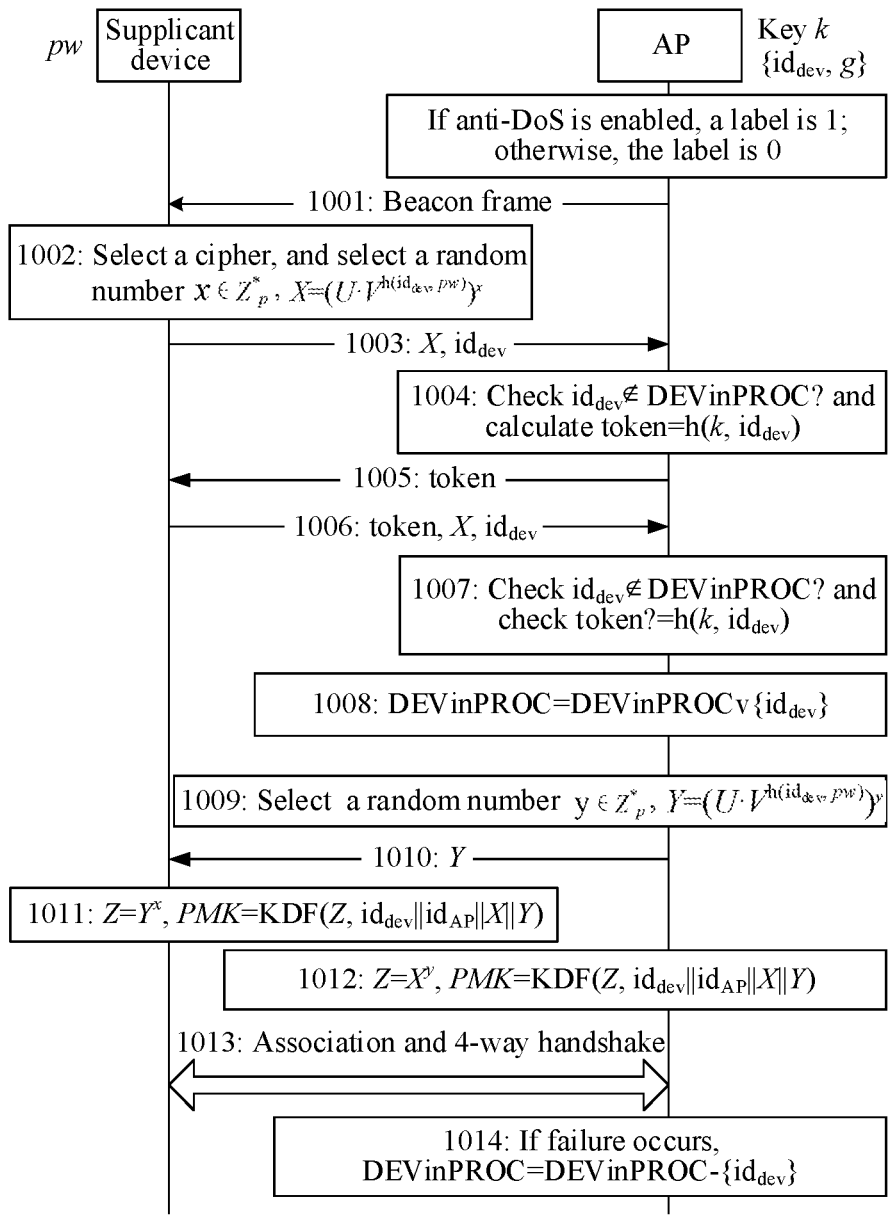
FIG. 10 is another specific example of a process corresponding to a device authentication protocol according to an embodiment of this application.

The following describes the two solutions in detail with reference to a device authentication protocol process in FIG. 10.

FIG. 10 shows another specific example of a process corresponding to a device authentication protocol. For example, the AP side may use the solution 1 and the solution 2 to reduce or avoid the DoS attack. The supplicant device may be the first device or the second device described above. This is not limited in this application. The supplicant device and the AP share a password pw (for example, $pw_{mst}$ or $pw_T$). The AP end may store $\{id_{dev}, g_{dev}\}$, where $id_{dev}$ represents an identifier of the supplicant device, or $g_{dev} = U \cdot V^{h(id_{dev}, pw)}$ or $g_{dev} = U \cdot V^{h(n_{dev}, pw)}$, and a key k is additionally set. $n_{dev}$ represents a random number. For example, when the supplicant device is the first device, $id_{dev}$ may be $id_{mst}$, $n_{dev}$ may be $n_{mst}$, and $g_{dev}$ may be $g_{mst}$. When the supplicant device is the second device, $id_{dev}$ may be $id_T$, $n_{dev}$ may be $n_T$, and $g_{dev}$ may be $g_T$.

It should be noted that in FIG. 10, an example in which $g_{dev} = U \cdot V^{h(id_{dev}, pw)}$ is used for description. When $g_{dev} = U \cdot V^{h(n_{dev}, pw)}$, for the process corresponding to the device authentication protocol, refer to descriptions in FIG. 10. Details are not described again.

It should be understood that, although steps or operations of the device authentication protocol process are shown in FIG. 10, the steps or operations are only examples, and other operations or variations of the operations in FIG. 10 may also be performed in this embodiment of this application. Furthermore, the steps in FIG. 10 may be performed in a sequence different from that presented in FIG. 10, and all operations in FIG. 10 may not need to be performed.

As shown in FIG. 10, the device authentication process may include step 1001 to step 1014.

Optionally, in embodiments of this application, whether to enable an anti-DoS mechanism may be set. In an example, a label may be preset. When the anti-DoS mechanism is enabled, a label value may be set to 1; otherwise, a label value may be set to 0. When the anti-DoS mechanism is enabled, the token sent by the supplicant device may be checked. This is not limited in this application.

1001: An AP broadcasts a beacon frame. The beacon frame may include an identifier (which may be represented as $id_{AP}$) of the AP, for example, may be a MAC address (which may be represented as $MAC_{AP}$) of the AP. Optionally, the beacon frame may further include RSNEwithsupp. ciphers (robust security network element with supported ciphers), to notify a capability and the like of the ciphers. This is not limited in this application.

Correspondingly, the supplicant device may receive the beacon frame, and determine that the supplicant device needs to be connected to a Wi-Fi network provided by the AP.

1002: The supplicant device selects a cipher, selects a random number $x \in Z^*_p$, and determines $X = (U \cdot V^{h(id_{dev}, pw)})^x$.

For example, the supplicant device selects matched ciphers, that is, selects a cipher suite supported by the supplicant device, to obtain g, or obtain related parameters (for example, U and V) for obtaining g.

Herein, that the AP broadcasts RSNEwithsupp. ciphers and the supplicant device selects the matched ciphers may be an example in which the AP is associated with the supplicant device to negotiate a to-be-used security suite. In an example, after the supplicant device selects a cipher suite, g or U and V may be stored on a first device side as system parameters.

For example, when the supplicant device selects the random number $x \in Z^*_p$ and determines $X = (U \cdot V^{h(id_{dev}, pw)})^x$, refer to the descriptions in step 701 in FIG. 7 or step 901 in FIG. 9. Details are not described herein again.

1003: The supplicant device sends X and $id_{dev}$ to the AP. Correspondingly, the AP receives X and $id_{dev}$.

In an example, the supplicant device may send a connection request to the AP, where the connection request includes X and $id_{dev}$. This is not limited in this application.

1004: The AP checks $MAC_{dev} \notin DEVinPROC$? and calculates $token = h(k, MAC_{dev})$.

Specifically, when $MAC_{dev} \notin DEVinPROC$, the AP calculates $token = h(k, MAC_{dev})$, and when $MAC_{dev} \in DEVinPROC$, the AP does not calculate $token = h(k, MAC_{dev})$.

In an example, the list (which may be represented as DEVinPROC) of devices in processing maintained on the AP end may include a MAC address of at least one supplicant device (that is, a device in processing) connected to a network provided by the AP. When the MAC address of the supplicant device is not in DEVinPROC (that is, $MAC_{dev} \notin DEVinPROC$), the AP further processes a connection request of the supplicant device, that is, calculates token=h(k, $MAC_{dev}$) for the supplicant device based on the MAC address of the supplicant device and a key stored on the AP end. However, when the MAC address of the supplicant device is in DEVinPROC, that is, (MACdevE-DEVinPROC), it indicates that the supplicant device is already capable of connecting to the network provided by the AP. In this case, it may be inferred that the supplicant device uses a false MAC address to perform a malicious attack on the AP, and the supplicant device may be an attacker. In this case, the AP may not process the connection request of the supplicant device, that is, does not calculate the token for the supplicant device, to reduce or avoid the DoS attack on the AP.

1005: The AP sends the token to the supplicant device. That is, after generating the token bound to the address of $id_{dev}$, the AP returns the token to the supplicant device. Correspondingly, the supplicant device receives the token.

1006: The supplicant device sends the token, X, and $id_{dev}$ to the AP.

In an example, the supplicant device commits a connection request and a token to the AP again. For example, the token may be carried in the connection request. This is not limited in this application. For example, the token may alternatively be encapsulated together with the connection request in a message and sent to the AP.

Correspondingly, the AP receives the token, X, and $id_{dev}$.

1007: The AP checks $id_{dev} \notin$ DEVinPROC? checks token?=H(k, k, $MAC_{dev}$). That is, the AP checks whether $id_{dev}$ received in step 1006 is in the DEVinPROC list, and checks whether the token is equal to the token calculated in step 1004.

In an example, after $id_{dev}$ is not in the DEVinPROC list, that is, $id_{dev} \notin$ DEVinPROC, the AP may further check whether the token is equal to the token calculated by the AP in step 1004.

When $id_{dev} \notin$ DEVinPROC, and token=h(k, $id_{dev}$), that is, when the supplicant device is not the device in processing, and the token received by the AP in step 1006 is equal to the token calculated by the AP in step 1004, the AP may further process the connection request of the supplicant device.

When $id_{dev} \notin$ DEVinPROC, and token≠h(k, $id_{dev}$), that is, when the supplicant device is not the device in processing, but the token received by the AP in step 1006 is not equal to the token calculated by the AP in step 1004, the AP may not process the connection request of the supplicant device.

Therefore, in embodiments of this application, the AP can generate, based on the identifier $id_{dev}$ of the supplicant device and the key k stored on the AP end, an anti-DoS token bound to the identifier of the supplicant device, and return the token to the supplicant device. The supplicant device needs to send the identifier $id_{dev}$ of the supplicant device and the token to the AP again, so that the AP can check the identifier $id_{dev}$ of the supplicant device and the corresponding token, and process the connection request of the supplicant device only when checking the token succeeds. Therefore, this can help prevent the AP from processing all connection requests, and help reduce or avoid the DoS attack on the AP.

When $id_{dev} \in$ DEVinPROC, the AP may not check the token, that is, may not process the connection request of the supplicant device.

1008: DEVinPROC=DEVinPROC$_\cup${$id_{dev}$}.

Specifically, DEVinPROC=DEVinPROC$_\cup${$id_{dev}$} indicates that the identifier $id_{dev}$ of the supplicant device may be added to the existing DEVinPROC list, to update DEVinPROC. In this way, when a connection request including $id_{dev}$ is subsequently received, because $id_{dev}$ is already included in the DEVinPROC, the AP may not process the connection request, thereby helping reduce or avoid the DoS attack on the AP.

1009: Select a random number ye $Z^*_p$, and determine $Y=(U \cdot V^{h(id_{dev},pw)})^y$.

1010: The AP sends Y to the supplicant device.

1011: The supplicant device calculates $Z=Y^x$ and PMK=KDF(Z, $id_{dev}||id_{AP}||X||Y$).

1012: The AP calculates $Z=X^y$ and PMK=KDF(Z, $id_{dev}||id_{AP}||X||Y$).

1013: The supplicant device performs an association and the 4-way handshake with the AP.

Specifically, for step 1009 to step 1013, refer to the descriptions of step 703 to step 707 in FIG. 7, or refer to the descriptions of step 903 to step 907 in FIG. 9. Details are not described herein again.

1014: If the operation fails, DEVinPROC=DEVinPROC−{$id_{dev}$}.

Specifically, if identity authentication or key generation between the supplicant device and the AP fails, that is, the supplicant device is not a device in processing of the AP at this time, the identifier of the supplicant device may be deleted from the current DEVinPROC list. In this way, the supplicant device can still send a connection request to the AP subsequently. In addition, because the identifier of the supplicant device is not in DEVinPROC, the AP can perform corresponding processing on the connection request of the supplicant device.

Therefore, in embodiments of this application, the AP further processes the connection request of the supplicant device only when determining that the MAC address of the supplicant device is not in the DEVinPROC list of the AP. This can help prevent the AP from processing all connection requests, help reduce a calculation amount of the AP end, and help reduce or avoid the DoS attack on the AP.

It may be understood that, in the foregoing embodiments of this application, the method implemented by the AP may also be implemented by a component (for example, a chip or a circuit) that may be used in the AP, the method implemented by the first device may also be implemented by a component (for example, a chip or a circuit) that may be used in the first device, and the method implemented by the second device may also be implemented by a component (for example, a chip or a circuit) that may be used in the second device.

Figure 11:
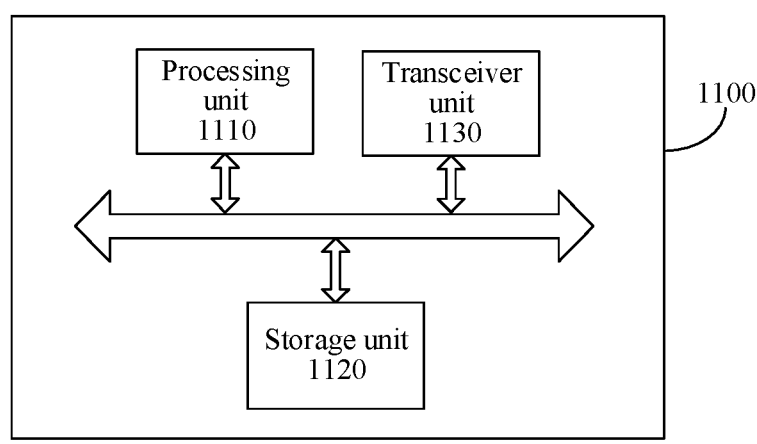
FIG. 11 is a schematic diagram of a security authentication apparatus applied to Wi-Fi according to an embodiment of this application.

According to the foregoing methods, FIG. 11 is a schematic diagram of a security authentication apparatus 1100 applied to Wi-Fi according to an embodiment of this application.

In some embodiments, the apparatus 1100 may be an AP, or may be a chip or a circuit, for example, a chip or a circuit that may be disposed in the AP. In some embodiments, the apparatus 1100 may be a first device, or may be a chip or a circuit, for example, a chip or a circuit that may be disposed in the first device. In some embodiments, the apparatus 1100 may be a second device, or may be a chip or a circuit, for example, a chip or a circuit that may be disposed in the second device.

The apparatus 1100 may include a processing unit 1110 (namely, an example of a processor) and a transceiver unit 1130.

Optionally, the transceiver unit 1130 may be implemented by using a transceiver, a transceiver-related circuit, or an interface circuit.

Optionally, the apparatus may further include a storage unit 1120. In a possible manner, the storage unit 1120 is configured to store instructions. Optionally, the storage unit may also be configured to store data or information. The storage unit 1120 may be implemented via a memory.

In a possible design, the processing unit 1110 may be configured to execute the instructions stored in the storage unit 1120, to enable the apparatus 1100 to implement the steps performed by the AP in the foregoing method.

Further, the processing unit 1110, the storage unit 1120, and the transceiver unit 1130 may communicate with each other through an internal connection path, to transmit a control signal and/or a data signal. For example, the storage unit 1120 is configured to store a computer program, and the processing unit 1110 may be configured to invoke the computer program from the storage unit 1120 and run the computer program, to control the transceiver unit 1130 to receive a signal and/or send a signal, to complete the steps of the AP in the foregoing method.

For example, when the processing unit 1110 is a processor and the transceiver unit 1130 is a transceiver, the processor may be coupled to the transceiver, for example, send instructions to the transceiver, to instruct (or control) the transceiver unit to receive a signal and/or send a signal, to complete the steps of the AP in the foregoing method.

In a possible design, the processing unit 1110 may be configured to execute the instructions stored in the storage unit 1120, to enable the apparatus 1100 to implement the steps performed by the first device in the foregoing method.

Further, the processing unit 1110, the storage unit 1120, and the transceiver unit 1130 may communicate with each other through an internal connection path, to transmit a control signal and/or a data signal. For example, the storage unit 1120 is configured to store a computer program, and the processing unit 1110 may be configured to invoke the computer program from the storage unit 1120 and run the computer program, to control the transceiver unit 1130 to receive a signal and/or send a signal, to complete the steps of the first device in the foregoing method.

For example, when the processor unit 1110 is a processor and the transceiver unit 1130 is a transceiver, the processor may be coupled to the transceiver, for example, send instructions to the transceiver, to instruct (or control) the transceiver unit to receive a signal and/or send a signal, to complete the steps of the first device in the foregoing method.

In a possible design, the processing unit 1110 may be configured to execute the instructions stored in the storage unit 1120, to enable the apparatus 1100 to implement the steps performed by the second device in the foregoing method.

Further, the processing unit 1110, the storage unit 1120, and the transceiver unit 1130 may communicate with each other through an internal connection path, to transmit a control signal and/or a data signal. For example, the storage unit 1120 is configured to store a computer program, and the processing unit 1110 may be configured to invoke the computer program from the storage unit 1120 and run the computer program, to control the transceiver unit 1130 to receive a signal and/or send a signal, to complete the steps of the second device in the foregoing method.

For example, when the processor unit 1110 is a processor and the transceiver unit 1130 is a transceiver, the processor may be coupled to the transceiver, for example, send instructions to the transceiver, to instruct (or control) the transceiver unit to receive a signal and/or send a signal, to complete the steps of the second device in the foregoing method.

The storage unit 1120 may be integrated into the processing unit 1110, or may be disposed separately from the processing unit 1110.

Optionally, if the apparatus 1100 is a communication device, the transceiver unit 1130 may include a receiver and a transmitter. The receiver and the transmitter may be a same physical entity or different physical entities. When the receiver and the transmitter are the same physical entity, the receiver and the transmitter may be collectively referred to as a transceiver.

Optionally, if the apparatus 1100 is a chip or a circuit, the transceiver unit 1130 includes an input interface and an output interface.

In an implementation, it may be considered that a function of the transceiver unit 1130 is implemented via a transceiver circuit or a dedicated transceiver chip. It may be considered that the processing unit 1110 is implemented via a dedicated processing chip, a processing circuit, a processing unit, or a general-purpose chip.

In another implementation, it may be considered that a communication device (for example, the AP, the first device, or the second device) provided in embodiments of this application is implemented via a general-purpose computer. That is, program code for implementing functions of the processing unit 1110 and the transceiver unit 1130 is stored in the storage unit 1120, and a general-purpose processing unit implements the functions of the processing unit 1110 and the transceiver unit 1130 by executing the code in the storage unit 1120.

In some implementations, when the apparatus 1100 is an AP or a chip or a circuit disposed in the AP, the transceiver unit 1130 is configured to receive a first password input by a first device, where the first password is a password preset before delivery.

The processing unit 1110 is configured to obtain, when checking the first password by the AP succeeds, a second password shared between the AP and the first device, where the second password is a shared key between the first device and the AP.

The processing unit 1110 is further configured to perform the 4-way handshake with the first device based on the second password. For example, the processing unit 1110 may perform the 4-way handshake with the first device via the transceiver unit 1130.

The transceiver unit 1130 is further configured to receive a first request from the first device, where the first request is used to request a second device to access the AP.

The processing unit 1110 is further configured to control the transceiver unit 1130 to send a third password to the first device in response to the first request, where the third password is a shared key between the second device and the AP.

In some possible implementations, the processing unit 1110 is specifically configured to negotiate a first pairwise master key PMK1 with the first device based on the second password and according to a twin base password encrypted key exchange TBPEKE protocol, and perform the 4-way handshake with the first device based on the first PMK1.

In some possible implementations, the processing unit 1110 is further configured to determine a first hash-to-curve function $g_{mst}$ corresponding to the first device based on the second password, where the first hash-to-curve function $g_{mst}$ is used to convert the second password into a point on an elliptic curve through a point multiplication operation; and store an identifier of the first device and the first hash-tocurve function $g_{mst}$, where there is a correspondence between the identifier of the first device and the first hash-to-curve function $g_{mst}$.

In some possible implementations, the first hash-to-curve function $g_{mst}$ is represented as:

$$g_{mst}=U \cdot V^{h(id_{mst},pw_{mst})}, \text{ where}$$

U and V are respectively two independent random generators obtained from a cyclic group G whose order is a prime number p, h( ) is a secure hash function, $id_{mst}$ represents the identifier of the first device, and $pw_{mst}$ represents the second password.

In some possible implementations, the first hash-to-curve function $g_{mst}$ is represented as:

$$g_{mst}=U \cdot V^{h(n_{mst},pw_{mst})}, \text{ where}$$

U and V are respectively two independent random generators obtained from a cyclic group G whose order is a prime number p, h( ) is a secure hash function, must is a random number, and pwinsi represents the second password.

In some possible implementations, the processing unit 1110 is further configured to determine that the first password is invalid.

In some possible implementations, the processing unit 1110 is further configured to delete the identifier of the first device and the second password, and activate the first password.

In some possible implementations, the processing unit 1110 is further configured to perform the 4-way handshake with the second device based on the third password. For example, the processing unit 1110 may perform the 4-way handshake with the second device via the transceiver unit 1130.

In some possible implementations, the processing unit 1110 is specifically configured to negotiate a second pairwise master key PMK2 with the second device based on the third password and according to the twin base password encrypted key exchange TBPEKE protocol, and perform the 4-way handshake with the first device based on the second PMK2.

In some possible implementations, the processing unit 1110 is further configured to determine a second hash-to-curve function $g_T$ corresponding to the second device based on the third password, where the second hash-to-curve function $g_T$ is used to convert the third password into a point on the elliptic curve through the point multiplication operation; and store an identifier of the second device and the second hash-to-curve function $g_T$, where there is a correspondence between the identifier of the second device and the second hash-to-curve function $g_T$.

In some possible implementations, the second hash-to-curve function $g_T$ is represented as:

$$g_T=U \cdot V^{h(id_T,pw_T)}, \text{ where}$$

U and V are respectively two independent random generators obtained from a cyclic group G whose order is a prime number p, h( ) is a secure hash function, $id_T$ represents the identifier of the second device, and $pw_T$ represents the third password.

In some possible implementations, the second hash-to-curve function $g_T$ is represented as:

$$g_T=U \cdot V^{h(n_T,pw_T)}, \text{ where}$$

U and V are respectively two independent random generators obtained from a cyclic group G whose order is a prime number p, h( ) is a secure hash function, $n_T$ is a random number, and $pw_T$ represents the third password.

In some possible implementations, the first request includes the identifier of the second device.

In some possible implementations, the identifier of the second device is a MAC address of the second device.

In some implementations, when the apparatus 1100 is a first device or a chip or circuit disposed in the first device, the transceiver unit 1130 is configured to send a first password to an access point AP, where the first password is a password preset before delivery.

The processing unit 1110 is configured to obtain, when checking the first password by the AP succeeds, a second password shared between the AP and the first device, where the second password is a shared key between the first device and the AP.

The processing unit 1110 is further configured to perform the 4-way handshake with the AP based on the second password. For example, the processing unit 1110 may perform the 4-way handshake with the AP via the transceiver unit 1130.

The transceiver unit 1130 is further configured to receive a second request from a second device, where the second request is used to request to allow the second device to access the AP.

The processing unit 1110 is further configured to control the transceiver unit to send a first request to the AP in response to the second request, where the first request is used to request the second device to access the AP.

The transceiver unit 1130 is further configured to receive a third password from the AP, where the third password is a shared key between the second device and the AP.

The transceiver unit 1130 is further configured to send the third password to the second device.

In some possible implementations, the processing unit 1110 is specifically configured to negotiate a first pairwise master key PMK1 with the AP based on the second password and according to a twin base password encrypted key exchange TBPEKE protocol, and perform, by the first device, the 4-way handshake with the AP based on the first PMK1.

In some possible implementations, the processing unit 1110 is further configured to determine a first hash-to-curve function $g_{mst}$ corresponding to the first device based on the second password, where the first hash-to-curve function $g_{mst}$ is used to convert the second password into a point on an elliptic curve through a point multiplication operation.

In some possible implementations, the first hash-to-curve function $g_{mst}$ is represented as:

$$g_{mst}=U \cdot V^{h(id_{mst},pw_{mst})}, \text{ where}$$

U and V are respectively two independent random generators obtained from a cyclic group G whose order is a prime number p, h( ) is a secure hash function, $id_{mst}$ represents an identifier of the first device, and $pw_{mst}$ represents the second password.

In some possible implementations, the first hash-to-curve function $g_{mst}$ is represented as:

$$g_{mst}=U \cdot V^{h(n_{mst},pw_{mst})}, \text{ where}$$

U and V are respectively two independent random generators obtained from a cyclic group G whose order is a prime number p, h( ) is a secure hash function, must is a random number, and $pw_{mst}$ represents the second password.

In some possible implementations, the first request includes an identifier of the second device, and the second request includes the identifier of the second device.

In some possible implementations, the identifier of the second device is a MAC address of the second device.

In some implementations, when the apparatus 1100 is a second device or a chip or a circuit disposed in the second device, the transceiver unit 1130 is configured to send a second request to a first device, where the second request is used to request to allow the second device to access the AP.

The transceiver unit 1130 is further configured to receive a third password from the first device, where the third password is a shared key that is generated by the AP and that is between the second device and the AP.

In some possible implementations, the processing unit 1110 is further configured to perform the 4-way handshake with the AP based on the third password. For example, the processing unit 1110 may perform the 4-way handshake with the AP via the transceiver unit 1130.

In some possible implementations, the processing unit 1110 is specifically configured to negotiate a second pairwise master key PMK2 with the AP based on the third password and according to a twin base password encrypted key exchange TBPEKE protocol, and perform the 4-way handshake with the AP based on the second PMK2.

In some possible implementations, the processing unit 1110 is further configured to determine a second hash-to-curve function $g_T$ corresponding to the second device based on the third password, where the second hash-to-curve function $g_T$ is used to convert the third password into a point on an elliptic curve through a point multiplication operation.

In some possible implementations, the second hash-to-curve function $g_T$ is represented as:

$$g_T = U \cdot V^{h(id_T, pw_T)}, \text{ where}$$

U and V are respectively two independent random generators obtained from a cyclic group G whose order is a prime number p, h( ) is a secure hash function, $id_T$ represents an identifier of the first device, and $pw_T$ represents the third password.

In some possible implementations, the second hash-to-curve function $g_T$ is represented as:

$$g_T = U \cdot V^{h(n_T, pw_T)}, \text{ where}$$

U and V are respectively two independent random generators obtained from a cyclic group G whose order is a prime number p, h( ) is a secure hash function, $n_T$ is a random number, and $pw_T$ represents the third password.

In some possible implementations, the second request includes an identifier of the second device.

In some possible implementations, the identifier of the second device is a MAC address of the second device.

The units in the foregoing embodiment may also be referred to as modules, circuits, or components.

Functions and actions of the modules or the units in the apparatus 1100 listed above are merely examples for description. When the apparatus 1100 is configured in or is the AP, the modules or units in the apparatus 1100 may be configured to perform the actions or processing processes performed by the AP in the foregoing method embodiments. When the apparatus 1100 is configured in or is the first device, the modules or the units in the apparatus 1100 may be configured to perform the actions or processing processes performed by the first device in the foregoing method embodiments. When the apparatus 1100 is configured in the second device or is the second device, the modules or the units in the apparatus 1100 may be configured to perform the actions or processing processes performed by the second device in the foregoing method embodiments.

For concepts, explanations, detailed description, and other steps of the apparatus 1100 that are related to the technical solutions according to embodiments of this application, refer to description of the content in the foregoing method or other embodiments. Details are not described herein again.

According to the method provided in embodiments of this application, an embodiment of this application further provides a communication system, including the AP, the first device, and the second device.

It should be understood that, the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

All or some of the foregoing embodiments may be implemented via software, hardware, firmware, or any other combination thereof. When software is used to implement embodiments, all or some of the foregoing embodiments may be implemented in a form of a computer program product. The computer program product includes one or more computer instructions or computer programs. When the computer instructions or the computer programs are loaded or executed on a computer, the procedure or functions according to embodiments of this application are all or partially generated. The computer may be a general-purpose computer, a dedicated computer, a computer network, or other programmable apparatuses. The computer instructions may be stored on a computer-readable storage medium, or transmitted from one computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium, or the like. The semiconductor medium may be a solid-state drive.

An embodiment of this application further provides a computer-readable medium that stores a computer program. When the computer program is executed by a computer, steps performed by the AP, steps performed by the first device, or steps performed by the second device in any one of the foregoing embodiments are implemented.

An embodiment of this application further provides a computer program product. When the computer program product is executed by a computer, steps performed by the AP, steps performed by the first device, or steps performed by the second device in any one of the foregoing embodiments are implemented.

An embodiment of this application further provides a system chip. The system chip includes: a communication unit and a processing unit. The processing unit may be, for example, a processor. The communication unit may be, for example, an input/output interface, a pin, or a circuit. The processing unit may execute computer instructions, so that a chip in the communication apparatus performs steps performed by the AP, steps performed by the first device, or steps performed by the second device provided in the foregoing embodiments of this application.

Optionally, the computer instructions are stored in a storage unit.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include and/or carry instructions and/or data.

It should be noted that in embodiments provided in this application, there is no time limitation relationship between the steps, and the steps may be used as a solution, or may be combined with one or more other steps to form a solution. This is not limited in this application.

Embodiments in this application may be used independently, or may be used jointly. For example, any one or more steps in different embodiments may be combined to form an embodiment separately. This is not limited herein.

It should be understood that in the foregoing embodiments, terms such as "first" and "second" are merely intended to distinguish different objects, and should not constitute any limitation on this application.

It should be understood that sequence numbers of the foregoing processes do not indicate an execution sequence in embodiments of this application. The execution sequence of the processes should be determined according to functions and internal logic of the processes, and should not be construed as any limitation on the implementation processes of embodiments of this application.

It should be further understood that the term "and/or" describes an association relationship between associated objects and represents that three relationships may exist. For example, A and/or B may represent the following three cases: Only A exists, both A and B exist, and only B exists. A character "/" generally indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are only examples. For example, division of the units is only logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A security authentication method applied to wireless fidelity (Wi-Fi), the method comprising:
receiving, by an access point (AP), a first password input by a first device;
obtaining, by the AP, when the first password is determined by the AP to be a preset password, a second password shared between the AP and the first device, wherein the second password is a shared key between the first device and the AP;
performing, by the AP, a 4-way handshake with the first device based on the second password;
receiving, by the AP, from the first device, a first request used to request a second device to have access to the AP; and
sending, by the AP, a third password to the first device in response to the first request, wherein the third password is a shared key between the second device and the AP.

2. The method according to claim 1, wherein performing, by the AP, the 4-way handshake with the first device comprises:
negotiating, by the AP, a first pairwise master key (PMK1) with the first device based on the second password and according to a twin base password encrypted key exchange (TBPEKE) protocol; and
performing, by the AP, the 4-way handshake with the first device based on the first PMK1.

3. The method according to claim 2, wherein before negotiating, by the AP, the first PMK1 with the first device, the method further comprises:
determining, by the AP based on the second password, a first hash-to-curve function ($g_{mst}$) corresponding to the first device, wherein the first $g_{mst}$ is used to convert the second password into a point on an elliptic curve through a point multiplication operation; and
storing, by the AP, an identifier of the first device and the first $g_{mst}$, wherein there is a correspondence between the identifier of the first device and the first $g_{mst}$.

4. The method according to claim 3, wherein the first $g_{mst}$ is represented as:

$g_{mst} = U \cdot V^{h(id_{mst}, pw_{mst})}$, wherein

U and V are respectively two independent random generators obtained from a cyclic group G whose order is a prime number p, h( ) is a secure hash function, $id_{mst}$ represents the identifier of the first device, and $pw_{mst}$ represents the second password.

5. The method according to claim 3, wherein the first $g_{mst}$ is represented as:

$g_{mst} = U \cdot V^{h(n_{mst}, pw_{mst})}$, wherein

U and V are respectively two independent random generators obtained from a cyclic group G whose order is a prime number p, h( ) is a secure hash function, $n_{mst}$ is a random number, and $pw_{mst}$ represents the second password.

6. The method according to claim 1, wherein after obtaining, by the AP, the second password, the method further comprises:
determining, by the AP, that the first password is invalid.

7. The method according to claim 6, further comprising:
after determining that the first password is invalid, deleting, by the AP, the identifier of the first device and the second password; and
activating, by the AP, the first password.

8. The method according to claim 1, further comprising:
performing, by the AP, a 4-way handshake with the second device based on the third password.

9. The method according to claim 8, wherein performing, by the AP, the 4-way handshake comprises:
negotiating, by the AP, a second pairwise master key (PMK2) with the second device based on the third password and according to a twin base password encrypted key exchange (TBPEKE) protocol; and
performing, by the AP, the 4-way handshake with the second device based on the second PMK2.

10. The method according to claim 9, wherein before negotiating, by the AP, the second PMK2 with the second device, the method further comprises:
determining, by the AP based on the third password, a second hash-to-curve function ($g_T$) corresponding to the second device, wherein the second $g_T$ is used to convert the third password into a point on the elliptic curve through the point multiplication operation; and
storing, by the AP, an identifier of the second device and the second $g_T$, wherein there is a correspondence between the identifier of the second device and the second $g_T$.

11. The method according to claim 10, wherein the second $g_T$ is represented as:

$g_T = U \cdot V^{h(id_T, pw_T)}$, wherein

U and V are respectively two independent random generators obtained from a cyclic group G whose order is a prime number p, h( ) is a secure hash function, $id_T$ represents the identifier of the second device, and $pw_T$ represents the third password.

12. The method according to claim 10, wherein the second $g_T$ is represented as:

$g_T = U \cdot V^{h(n_T, pw_T)}$, wherein

U and V are respectively two independent random generators obtained from a cyclic group G whose order is a prime number p, h( ) is a secure hash function, $n_T$ is a random number, and $pw_T$ represents the third password.

13. A security authentication method applied to wireless fidelity (Wi-Fi), the method comprising:
sending, by a first device, a first password to an access point (AP);
obtaining, by the first device, when the first password is determined by the AP to be a preset password, a second password shared between the AP and the first device, wherein the second password is a shared key between the first device and the AP;
performing, by the first device, a 4-way handshake with the AP based on the second password;
receiving, by the first device, a second request from a second device, wherein the second request is used to request to allow a second device to access the AP;
sending, by the first device, to the AP in response to the second request, a first request used to request the second device to have access to the AP;
receiving, by the first device, a third password from the AP, wherein the third password is a shared key between the second device and the AP; and sending, by the first device, the third password to the second device.

14. The method according to claim 13, wherein performing, by the first device, the 4-way handshake with the AP comprises:
negotiating, by the first device, a first pairwise master key (PMK1) with the AP based on the second password and according to a twin base password encrypted key exchange (TBPEKE) protocol; and
performing, by the first device, the 4-way handshake with the AP based on the first PMK1.

15. The method according to claim 14, wherein before negotiating, by the first device, the first PMK1 with the AP, the method further comprises:
determining, by the first device based on the second password, a first hash-to-curve function ($g_{mst}$) corresponding to the first device, wherein the first $g_{mst}$ is used to convert the second password into a point on an elliptic curve through a point multiplication operation.

16. The method according to claim 15, wherein the first $g_{mst}$ is represented as:

$$g_{mst} = U \cdot V^{h(id_{mst}, pw_{mst})}, \text{ wherein}$$

U and V are respectively two independent random generators obtained from a cyclic group G whose order is a prime number p, h( ) is a secure hash function, $id_{mst}$ represents an identifier of the first device, and $pw_{mst}$ represents the second password.

17. The method according to claim 15, wherein the first $g_{mst}$ is represented as:

$$g_{mst} = U \cdot V^{h(n_{mst}, pw_{mst})}, \text{ wherein}$$

U and V are respectively two independent random generators obtained from a cyclic group G whose order is a prime number p, h( ) is a secure hash function, $n_{mst}$ is a random number, and $pw_{mst}$ represents the second password.

18. A security authentication apparatus applied to wireless fidelity (Wi-Fi), comprising:
a processor and a transceiver, wherein the processor is coupled to the transceiver, and
the transceiver is configured to receive a first password input by a first device;
the processor is configured to obtain, when the first password is determined by the security authentication apparatus to be a preset password, a second password shared between the security authentication apparatus and the first device, wherein the second password is a shared key between the first device and the security authentication apparatus;
the processor is further configured to perform a 4-way handshake with the first device based on the second password;
the transceiver is further configured to receive a first request from the first device, the first request used to request a second device to have access to the security authentication apparatus; and
the processor is further configured to control the transceiver to send a third password to the first device in response to the first request, wherein the third password is a shared key between the second device and the security authentication apparatus.

19. The apparatus according to claim 18, wherein the processor is further configured to:
negotiate a first pairwise master key (PMK1) with the first device based on the second password and according to a twin base password encrypted key exchange (TB-PEKE) protocol; and
perform a 4-way handshake with the first device based on the first PMK1.

20. The apparatus according to claim 19, wherein the processor is further configured to:
determine, based on the second password, a first hash-to-curve function ($g_{mst}$) corresponding to the first device, wherein the first $g_{mst}$ is used to convert the second password into a point on an elliptic curve through a point multiplication operation; and
store an identifier of the first device and the first $g_{mst}$, wherein there is a correspondence between the identifier of the first device and the first $g_{mst}$.

* * * * *